US005854365A

United States Patent [19]
Ohno et al.

[11] Patent Number: 5,854,365
[45] Date of Patent: Dec. 29, 1998

[54] TONER FOR DEVELOPING ELECTROSTATIC IMAGE AND METHOD OF MANUFACTURING RESIN COMPOSITION

[75] Inventors: Manabu Ohno, Funabashi; Akihiko Nakazawa, Kanagawa-ken; Nobuyuki Okubo, Yokohama; Shunji Suzuki, Yokohama; Hiroyuki Suematsu, Yokohama; Masayoshi Kato, Iruma, all of Japan

[73] Assignee: Canon Kabushiki Kaisha, Tokyo, Japan

[21] Appl. No.: 575,142

[22] Filed: Dec. 19, 1995

Related U.S. Application Data

[63] Continuation of Ser. No. 182,387, Jan. 18, 1994, Pat. No. 5,489,498.

[30] Foreign Application Priority Data

Jan. 20, 1993 [JP] Japan .................................... 023469
Mar. 31, 1993 [JP] Japan .................................... 095004

[51] Int. Cl.$^6$ .................................................... C08F 4/38

[52] U.S. Cl. .................. 526/228; 526/219.2; 526/219.6; 526/232.1; 526/232.3; 524/275; 524/277; 525/273; 525/260; 525/263; 525/264; 525/265

[58] Field of Search .................................. 525/260, 263, 525/265, 264, 273; 526/219.2, 219.6, 227, 228, 232.1, 232.3; 524/275, 277

[56] References Cited

U.S. PATENT DOCUMENTS

| | | | |
|---|---|---|---|
| 2,297,691 | 10/1942 | Carlson | 95/5 |
| 4,499,168 | 2/1985 | Mitsuhashi | 430/99 |
| 4,939,060 | 7/1990 | Tomiyama et al. | 430/111 X |
| 5,051,331 | 9/1991 | Sakashita | 430/110 |
| 5,130,219 | 7/1992 | Mori et al. | 430/111 X |
| 5,149,941 | 9/1992 | Hirabayashi et al. | 219/216 |
| 5,268,248 | 12/1993 | Tanikawa et al. | 430/111 X |

FOREIGN PATENT DOCUMENTS

| | | |
|---|---|---|
| 42-23910 | 11/1967 | Japan . |
| 43-24748 | 10/1968 | Japan . |
| 52-3304 | 1/1977 | Japan . |
| 52-3305 | 1/1977 | Japan . |
| 59-87051 | 7/1981 | Japan . |
| 56-161144 | 12/1981 | Japan . |
| 57-52574 | 3/1982 | Japan . |
| 58-215659 | 12/1983 | Japan . |
| 60-217366 | 10/1985 | Japan . |
| 60-252361 | 12/1985 | Japan . |
| 60-252362 | 12/1985 | Japan . |
| 62-195683 | 8/1987 | Japan . |
| 63-127254 | 5/1988 | Japan . |
| 63-313182 | 12/1988 | Japan . |
| 1-187582 | 7/1989 | Japan . |
| 2-12160 | 1/1990 | Japan . |
| 2-2578 | 1/1990 | Japan . |
| 2-235069 | 9/1990 | Japan . |
| 3-26831 | 2/1991 | Japan . |
| 3-72505 | 3/1991 | Japan . |
| 3-185458 | 8/1991 | Japan . |
| 1442835 | 7/1976 | United Kingdom . |

*Primary Examiner*—Mark L. Warzel
*Attorney, Agent, or Firm*—Fitzpatrick, Cella, Harper & Scinto

[57] ABSTRACT

The present invention relates a toner for developing electrostatic images, comprising: a resin composition, which contains a binder resin and low molecular weight wax, and a coloring agent, wherein the binder resin does not substantially contain insoluble tetrahydrofuran (THF) component, its chromatograph measured with soluble tetrahydrofuran (THF) component has a main peak in a region of a molecular weight of 2,000 to 30,000 and a subpeak or a shoulder in a high molecular weight region of a molecular weight of 100,000 or more, a ratio of weight average molecular weight (Mw)/number average molecular weight (Mn) thereof is 30 or more, the high molecular weight region has a crosslinking monomer unit as a component monomer unit and the binder resin contains high molecular weight polymer having a Mw of 1,200,000 or more polymerized by using both polyfunctional initiator and a mono-functional initiator. Moreover, the present invention relates to a method of manufacturing a resin composition for producing a toner.

3 Claims, 3 Drawing Sheets

TONER FOR DEVELOPING ELECTROSTATIC IMAGE AND METHOD OF MANUFACTURING RESIN COMPOSITION

This application is a continuation of application Ser. No. 08/182,357 filed Jan. 18, 1994, now U.S. Pat. No. 5,489,498.

BACKGROUND OF THE INVENTION

FIELD OF THE INVENTION

The present invention relates to a toner for use in an image forming method, such as an electrophotography, an electrostatic printing method or a magnetic recording method to visualize an electrostatic latent image and relates to a method of manufacturing a resin composition for use in the toner. More particularly, the present invention relates to a toner for developing an electrostatic image for use in a fixing method of a type for fixing a visual image formed with toner to a recording medium using heat and relates to a method of manufacturing a resin composition for use in the toner.

A variety of electrophotography methods is known as disclosed in U.S. patent application Ser. No. 2,297,691, Japanese Patent Publication No. 42-23910 and Japanese Patent Publication No. 42-24748. In general, a copied article is obtained by a method comprising the steps of: using photoconductive substances; forming an electric latent image on a photosensitive medium by any one of a variety of means; the latent image is formed by using toner; if necessary the toner image is transferred to a transferring medium, such as paper; and the developed image is fixed with heat, pressure, heat and pressure or vapor of a solvent. Toner left from transferring on the photosensitive member is cleaned and the foregoing process is repeated.

In recent years, there have been requirements for a copying machine of the foregoing type to reduce the size and weight, raise the copying speed and improve reliability. Also toner must have improved characteristics in the foregoing circumstance. A variety of methods and apparatuses for use in a process for fixing the toner image onto a sheet made of paper for example has been developed. Among others, the most general method is a heat fixing method using a hot roller. The hot roller fixing method is a method of fixing the toner image in such a manner that the sheet, on which a toner image to be fixed is formed thereon, is passed through the hot rollers under pressure while bringing the surfaces of the sheet contact with the surfaces of the hot rollers. Since the foregoing method is arranged in such a manner that the surfaces of the hot rollers and the toner image to be fixed and formed on the sheet are brought into contact with each other under pressure, an excellent thermal efficiency can be realized when the toner image is fixed on to the sheet.

Therefore, the fixation process can quickly be completed, and therefore it is very effective for a high speed electrophotographic copying machine to employ the foregoing method.

However, the conventional hot roller fixation method encounters problems to be solved.

(1) A somewhat long waiting time takes place in which the formation of the image is inhibited until the hot roller is heated to predetermined temperature.

(2) In order to prevent defective fixation occurring due to change of the temperature of the hot roller caused from passing of the recording medium or an external disturbance and to prevent transference of toner (so-called an "offset phenomenon") to the hot roller, the hot roller must be maintained at the optimum temperature. Therefore, the hot roller or the heating unit must have a large thermal capacity. This however, leads to problem in that a large electric power is required and the temperature in the image forming apparatus is undesirably raised.

(3) Since the rollers are heated considerably, the recording medium and the toner placed on the recording medium are cooled slowly when the recording medium is passed through the hot roller to be discharged. Therefore, the toner is caused to have high viscosity, and therefore the recording medium can be undesirably introduced into the roller portion, causing a risk to arise in that paper jamming takes place.

Japanese Patent Application Laid-Open No. 63-313182 (corresponding to U.S. Pat. No. 5,149,941) discloses an image forming apparatus exhibiting short waiting time and small electric power consumption realized by a fixing unit arranged in such a manner that a visible toner image is, while interposing a heatproof sheet, heated employing pulse-like electric power. Similarly, Japanese Patent Application Laid-Open No. 1-187582 (corresponding to U.S. Pat. No. 5,149, 941) discloses a fixing apparatus of a type for heating and fixing a visible toner image on to a recording medium while interposing a heatproof sheet, the disclosed apparatus being characterized in that the heatproof sheet has a heat resisting layer and a separation layer or a low-resistance layer so that the offset phenomenon is effectively prevented.

In order to realize a fixing method exhibiting excellent fixation of the visible toner image on a recording medium, capable of preventing the offset phenomenon, shortening the waiting time and reducing the electric power consumption, the toner must have desired characteristics as well as the foregoing fixing apparatus.

Hitherto, toners have been provided with excellent fixation and offset resisting characteristics by the following methods:

(1) A method using a toner binder resin having two peaks in the molecular weight distribution;

(2) A method characterized in that a polyolefin polymer having a low molecular weight typified by wax having a low molecular weight is added to the toner; and (3) A method characterized in that wax or the like is previously added to the binder.

The foregoing method (1) has been disclosed, for example, in Japanese Patent Application Laid-Open No. 56-16144 (corresponding U.S. Pat. No. 4,499,168), Japanese Patent Application Laid-Open No.2-235069, Japanese Patent Application Laid-Open No. 63-127254 and Japanese Patent Application Laid-Open No. 3-26831. The method (2) has been disclosed in, for example, Japanese Patent Publication No. 52-3304 (corresponding U.K. Patent No. 1,442, 835), Japanese Patent Publication No. 52-3305 (corresponding U.K. Patent No. 1,442,835), Japanese Patent Application Laid-Open No. 57-52574, Japanese Patent Application Laid-Open No. 58-215659, Japanese Patent Application Laid-Open No. 60-217366, Japanese Patent Application Laid-Open No. 60-252361 and Japanese Patent Application Laid-Open No. 60-252362.

Although the method using the binder resin having two peaks in the molecular weight distribution therein and the method in which a releasing agent of a certain type is contained in the toner are able to somewhat improve the fixation and the offset resistance, binder components are sometimes nonuniformly dispersed. In this case, other components, for example, wax, cannot easily be dispersed or a specific component can easily be distributed eccentrically or freed. As a result, image contamination takes place due to fog or undesirable fusion to the photosensitive member or filming take place. Another method has been disclosed in Japanese Patent Application Laid-Open No. 3-72505 in which the molecular weight of the peak having the high molecular weight is further enlarged. However, the foregoing method is unsatisfactory to further improve the offset resistance. The foregoing method of simply further enlarging the molecular weight sometimes inhibits the dispersion of the other components as described above.

If kneading conditions to be employed in a melting and kneading process in the toner manufacturing method are made severer to improve the compatibility and the dispersion characteristics of the components of the toner, the breakage of molecular chains of the binder resin occurring due to kneading decreases the molecular weight of the binder resin. In this case, a problem arises in that the offset resistance deteriorates, and in particular hot offset resistance at high temperatures deteriorates. If a large quantity of wax is added to obtain satisfactory offset prevention characteristics, blocking resistance deteriorates and the wax dispersion further deteriorates. As a result, practical problems take place in that the image quality deteriorates due to enhancement of contamination of the surface of the developer carrier such as the carrier or the sleeve.

The method (3) characterized in that the wax or the like is previously added to the binder resin has been disclosed in, for example, Japanese Patent Application Laid-Open No. 62-195683, Japanese Patent Application Laid-Open No. 3-185458, Japanese Patent Application Laid-Open No. 56-87051, Japanese Patent Application Laid-Open No. 2-2578, and Japanese Patent Application Laid-Open No. 2-12160.

As compared with the methods (1) and (2), the method (3) exhibits excellent dispersion if the toner is made of binder resin having a narrow distribution of the molecular weights, and accordingly the offset resistance can somewhat be improved. However, the distribution of the molecular weights in the binder resin must be widened to further preferably improve the fixation at low temperatures and improve the offset resistance. If the wide distribution is applied to the binder having the two peaks in the molecular weight distribution thereof, the components having low molecular weights and those having high molecular weights are further separated, causing the compatibility of the components of the two types to further deteriorate. Therefore, the effect obtainable from previously dissolving the wax component cannot be obtained. What is worse, the surface of the photosensitive member or that of the carrier of the developer can be damaged or the toner can be solidified and fixed. It was found that the foregoing tendency is enhanced in proportion to the weight average molecular weight of the sole polymer component in the binder (specifically, it is made enhanced when $Mw \geqq 1,000,000$). If a polymer component satisfying $Mw \geqq 1,000,000$ is used and the resin composition satisfies $Mw/Mn > 30$, desired fixation characteristics and the offset resistance cannot be realized. What is worse, a critical problem takes place in matching with the developer as described above.

However, the various characteristics, which are required for the toner to satisfy, cannot simultaneously be satisfied in spite of rising of a desire in recent years while improving the level of the characteristics. Although a collective study including the improvement in the developing characteristics has been made, the results have not been satisfactory.

The inventors of the present invention have investigated resin compositions, polymer components forming the resin composition and methods of manufacturing the compositions and the polymers, resulting in that toner is obtained which exhibits:(i) a considerably wide temperature range in which fixing can be performed, (ii) excellent reproducibility of fine lines and (iii) performance capable of forming stable images having excellent image quality.

SUMMARY OF THE INVENTION

An object of the present is to provide a toner for developing electrostatic images that is capable of overcoming the conventional problems.

Another object of the present invention is to provide a toner for developing electrostatic images which is capable of improving fixation and offset resistance and forming high quality toner images.

Another object of the present invention is to provide a toner for developing electrostatic images which does not adversely affect a photosensitive member or a developer carrier.

Another object of the present invention is to provide a method of producing a resin composition for producing the toner.

According to one aspect of the present invention, there is provided a toner for developing electrostatic images, comprising: a resin composition, which contains a binder resin and low molecular weight wax, and a coloring agent, wherein the resin composition does not substantially contain insoluble tetrahydrofuran (THF) component, its GPC chromatograph measured with soluble tetrahydrofuran (THF) component has a main peak in a region of a molecular weight of 2,000 to 30,000 and a subpeak or a shoulder in a high molecular weight region of a molecular weight of 100,000 or more, a ratio of weight average molecular weight (Mw)/number average molecular weight (Mn) thereof is 30 or more, the high molecular weight region has a crosslinking monomer unit as a component monomer unit and the binder resin contains high molecular weight polymer having a Mw of 1,200,000 or more polymerized by using both polyfunctional initiator and a monofunctional initiator.

According to another aspect of the present invention, there is provided a process for producing a resin composition, comprising the steps of: using a mixture of a polymerizable monomer and a crosslinking monomer to produce a high molecular weight polymer having a weight average molecular weight of 1,200,000 or more by using a polyfunctional polymerization initiator and a monofunctional polymerization initiator; and mixing the high molecular weight polymer and a low molecular weight polymer with each other so that a resin composition is obtained which does not substantially contain insoluble tetrahydrofuran (THF) component, a chromatograph of which measured with soluble tetrahydrofuran (THF) component has a main peak in a region of a molecular weight of 2,000 to 30,000 and a subpeak or a shoulder in a high molecular weight region of a molecular weight of 100,000 or more, and a ratio of weight average molecular weight (Mw)/number average molecular weight (Mn) of which is 30 or more.

DETAILED DESCRIPTION OF THE PREFERRED EMBODIMENTS

Figure 1:
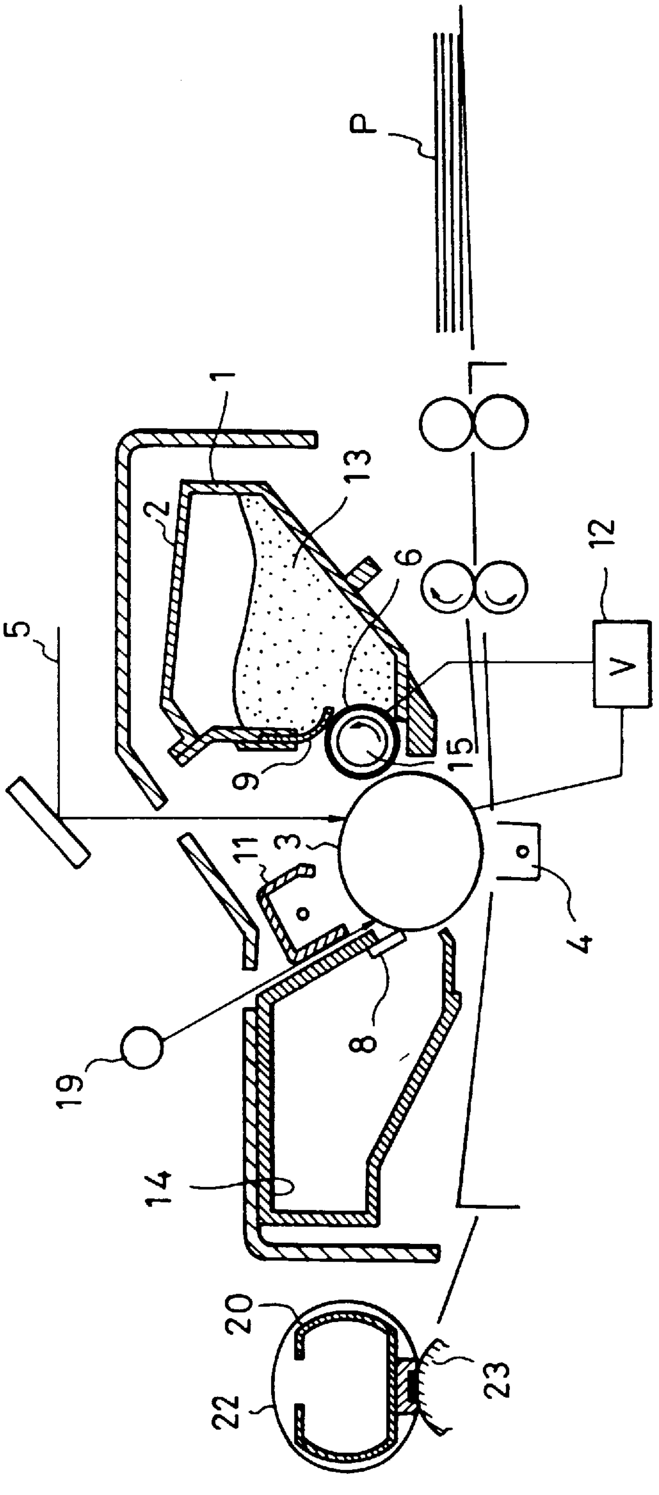
FIG. 1 is a schematic explanatory view which illustrates an image forming apparatus adapted to embodiments of the present invention.

The inventors of the present invention consider the reason why the toner according to the present invention exhibits the effect is as follows.

The resin composition according to the present invention enables polymers having a high molecular weight Mw of 1,200,000 to be manufactured by polymerizing a monomer composition containing cross-linking monomer units as components by using both polyfunctional initiator material and monofunctional initiator material even though the composition does not contain a tetrahydrofuran insoluble component. Further, dissolving or dispersing the polymer having high molecular weight with wax having low molecular weight results in that the wax having the low molecular weight plasticizes the polymer having the high molecular weight, and therefore the miscibility is enhanced. Further, the viscosity difference between high-solvency viscous components, which have been locally phase-separated in the solution of the polymer having the high molecular weight, and other components can be eliminated. Therefore, breakage of polymer chains which takes place due to mechanical shearing force can be prevented even if the external mixing force is enlarged. Therefore, uniform dispersion can further easily be realized. When the polymer having high molecular weight and the polymer having low molecular weight are mixed with each other, the synergistic effect of them enables a resin composition exhibiting excellent compatibility to be obtained.

The wax having the low molecular weight for use in the toner according to the present invention is exemplified by wax materials, such as polypropylene, polyethylene, microcrystalline wax, carnauba wax, sasol wax or paraffin wax, their oxides and natured graft material.

The low-molecular-weight wax preferably has a weight average molecular weight of 30,000 or less, preferably 500 to 20,000. The preferred quantity of the additives is about 2 to 100 parts by weight with respect to 100 parts by weight of the polymer component having the high molecular weight.

The weight average molecular weight of the high-molecular-weight component of the resin composition according to the present invention is 1,200,000 or more, preferably 1,250,000 or more, and more preferably 1,300,000 or more. The results of GPC chromatography is preferably a maximal value in a range of 500,000 or more, preferably 600,000 to 3,000,000, more preferably 700,000 to 2,500,000. The preferred quantity of insoluble THF is 5 wt % or less.

The preferred weight average molecular weight of the low-molecular-weight component is 30,000 or less, more preferably 3,000 to 25,000.

It is preferable that the ratio Mw/Mn of the resin composition according to the present invention is 30 or more. If the ratio Mw/Mn is less than 30, both satisfactory fixation and the offset resistance cannot be realized. It is more preferable that it is 35 or higher.

The distribution of the molecular weights of the resin and the wax for use in the toner according to the present invention is measured by the GPC (Gel Permeation Chromatography) under the following conditions.

<Conditions for measuring the resin by GPC>

Apparatus GPC-150C (manufactured by Waters)

Column KF801 to 7 (a 7-serial type column manufactured by ShowDex)

Temperature 40° C.

Solvent THF (Tetrahydrofuran)

Flow rate 1.0 ml/min.

Sample 0.1 ml of sample, the concentration of which is 0.05 to 0.6 wt %, is injected <Conditions for measuring the wax by GPC>

Apparatus GPC-150C (manufactured by Waters)

Column GMH-HT (a 2-serial type column manufactured by Toso)

Temperature 135° C.

Solvent o-dichlorobenzene (ionol is added by 0.1%)

Flow rate 1.0 ml/min.

Sample 0.1 ml of sample, the concentration of which is 0.15 wt %, is injected

The measurement is performed under the foregoing conditions, and the molecular weight of the sample is calculated by using calibration curves made from monodispersed polystyrene standard samples. The molecular weight of the wax is calculated by converting the values with a conversion equation deduced from a Mark-Houwink viscosity equation.

The insoluble quantity of THF in the resin is defined with values measured by the following method.

0.5 to 1.0 g of the resin sample is weighed (the result is represented by $w_1$g), the sample is then injected into a cylindrical paper filter (for example, No. 86R manufactured by Toyo Roshi) and placed in a Soxhlet extractor as to be extracted with 100 to 200 ml of THF for 6 hours. A solution of the soluble portion of the extracted components is then evaporated, and dried at 100° C. for several hours. Then, the quantity ($w_2$g) of the soluble resin component of THF is weighed so that the insoluble quantity of THF is obtained with the following equation.

$$\text{Insoluble quantity of THF (wt \%)}=100\ (w_1-w_2)/w_1$$

The glass transition point Tg of the resin according to the present invention is measured by a differential thermal analysis unit (a DSC measuring unit DSC-7 manufactured by Perkin Elmer).

5 to 20 mg, preferably 10 mg of the samples to be measured are weighed precisely.

The samples are then injected into an aluminum pan, and an empty aluminum pan is used to serve as a reference. Then, the temperature measuring range 30° C. to 200° C. is set and the temperature rise rate of 10° C./min is employed to measure the samples at room temperature and normal humidity.

During the foregoing temperature rise process, the heat absorption peak of the main peak in a temperature range 40° C. to 100° C. can be obtained.

The intersections of lines connecting intermediate points of the base lines in front and in the rear of the heat absorption peak and the differential heat curves are defined to be the glass transition points.

The method of synthesizing the component having a high molecular weight of the resin composition according to the present invention may be an emulsification polymerizing method or a suspension polymerizing method.

The emulsification polymerizing method is a method of performing polymerization by dispersing, as small particles, a substantially insoluble polymerizable monomer in a water phase containing an emulsifying agent and by using a water-soluble polymerization, initiator. Since the foregoing method is capable of easy adjustment, the reaction heat and the reaction stoppage speed is low due to the fact that the phase (an oil phase made of the polymer and the monomer) in which the polymerization is performed and the water phase are individually formed. Accordingly, a high polymerization rate can be realized. Therefore, considerable polymerized material can be obtained. Further, the polymerizing process is relatively simple.

However, the added emulsifying agent will cause the produced polymer to be readily contaminated, and therefore a process, such as salting out, is needed to extract the polymer. Therefore, it is preferable to employ the suspension polymerization as compared to the emulsification polymerization.

It is preferable to perform the emulsification polymerizing process in such a manner that not more than 100 parts by weight (more preferably 10 to 90 parts by weight) of the monomer is used with respect to 100 parts by weight of aqueous solvent. The available dispersant is represented by polyvinyl alcohol, polyvinyl containing suspended material in part and calcium phosphate. The quantity of the dispersant must be determined adequately depending upon the quantity of the monomer with respect to the aqueous solvent. In general, the quantity is 0.05 to 1 part by weight with respect to 100 parts by weight of the aqueous solvent. Although the polymerizing temperature is preferably 50° to 95° C., it is adequately determined depending upon the polymerization initiator to be used and the physical properties of the desired polymer.

In the present invention, the polyfunctional initiator and the monofunctional initiator for use to synthesize the polymer having high molecular weight may be insoluble or hardly soluble with respect to water. It is preferable to use the monomers together in a quantity of 0.05 to 2.0 parts by weight with respect to 100 parts by weight of the monomer.

The polyfunctional-type polymerization initiator is represented by: a compound having two or more functional groups, such as peroxide groups, having polymerization initiating function in polymer oxide molecules; and a compound having both functional group, such as a peroxide group, having, in the molecule thereof, both polymerization initiating function and a polymerizable and unsaturated group.

The polyfunctional-type polymerization initiator is represented by 1,1-di-t-butylperoxy-3,3,5-trimethylcyclohexane, 1,3-bis-(t-butylperoxyisopropyl) benzene, 2,5-dimethyl-2,5-(t-butylperoxy) hexane, 2,5-dimethyl-2,5-di-(t-butylperoxy) hexyne-3, tris-(t-butylperoxy) triazine, 1,1-di-t-butylperoxycyclohexane, 2,2-di-t-butylperoxybutane, 4,4-di-t-butylperoxyvaleric acid-n-butylester, di-t-butylperoxyhexahydroterephthalate, di-t-butylperoxyazelate, di-t-butylperoxytrimethyladipate, 2,2-bis-(4,4-di-t-butylperoxycyclohexyl) propane, 2,2-t-butylperoxyoctane, diallylperoxydicarbonate, t-butylperoxymaleic acid, t-butylperoxyallylcarbonate and t-butylperoxyisopropyl fumarate.

Among the foregoing materials, it is preferable to use 1,1-di-t-butylperoxy-3,3,5-trimethylcyclohexane, 1,1-di-t-butylperoxycyclohexane, di-t-butylperoxyhexahydroterephthalate, di-t-butylperoxyazelate, 2,2-bis-(4,4-di-t-butylperoxycyclohexyl) propane or t-butylperoxyallylcarbonate.

It is preferable for the monofunctional initiator to be used together with the polyfunctional polymerization initiator to have a decomposing temperature of a half life period of 10 hours which is lower than the half life period of 10 hours of the polyfunctional polymerization initiator.

The monofunctional polymerization initiator is represented by: an organic peroxide, such as benzoyl peroxide, 1,1-di (t-butylperoxy)-3,3-5-trimethylcyclohexane, n-butyl-4,4-di (t-butylperoxy) valerate, dicumylperoxide, α,α'-bis (t-butylperoxydiisopropyl) benzene, and t-butylperoxycumene; and diazo compound such as azobisisobutyronitrile or diazoaminoazobenzene.

Although the monofunctional polymerization initiator may be added to the monomer simultaneously with adding the polyfunctional polymerization initiator, it is preferable to add it after the half time period of the polyfunctional polymerization initiator has passed to adequately maintain the efficiency of the polyfunctional polymerization initiator.

The polymer having high molecular weight according to the present invention is polymerized in the presence of cross-linking monomer.

The crosslinking monomer may be a monomer having two or more double bonds which can be polymerized. Specifically, any one of the following materials may be employed: an aromatic divinyl compound (for example, divinyl benzene or divinyl naphthalene); a diacrylate compound bonded by an alkyl chain (for example, ethylene glycol diacrylate, 1,3-butylene glycol diacrylate, 1,4-butanedioldiacrylate, 1,5-pentanedioldiacrylate, 1,6-hexane dioldiacrylate, neopentyl glycol diacrylate or a compound having methacrylate in place of the acrylate of the foregoing compounds); a diacrylate compound bonded by an alkyl chain including ether bond (for example, diethylene glycol diacrylate, triethylene glycol diacrylate, tetraethylene glycol diacrylate, polyethylene glycol #400 diacrylate, polyethylene glycol #600 diacrylate, dipropylene glycol diacrylate and a compound having the methacrylate in place of the acrylate of the foregoing compounds); a diacrylate compound bonded by a chain including an aromatic group and an ether bond (for example, polyoxyethylene (2)-2, 2-bis (4-hydroxyphenyl) propane diacrylate, polyoxyethylene (4)-2,2-bis (4-hydroxyphenyl) propane diacrylate and a compound having methacrylate in place of the acrylate of the foregoing compounds); and a polyester-type diacrylate compound (for example, MANDA (trade name of Nihon Kayaku). The polyfunctional crosslinking agent is represented by pentaerythritol acrylate, trimethylolethane triacrylate, trimethylol propane triacrylate, tetramethylol propane triacrylate, tetramethylol methane tetraacrylate, oligoester acryate and a compound having methacrylate in place of acrylate of the foregoing compound; triarylcyanoaurate and triaryltrimellitate.

The employed crosslinking agent is used in a quantity not more than 1 wt % with respect to 100 wt %, preferably 0.001 to 0.5 wt % of the other monomer component.

Among the foregoing crosslinking monomers, preferred crosslinking monomers are aromatic divinyl compounds (in particular divinyl benzene) and diacrylate bonded by a chain including an aromatic group and an ether bond in terms of improving the fixation and offset resistance.

If the foregoing functional initiator or the crosslinking agent is used in the polymer having the high molecular weight and forming the resin composition according to the present invention, the mixture of the polymer having the high molecular weight with the wax having the low molecular weight relaxes the phase separation in the micro-region and prevents the re-aggregation of high-molecular-weight molecules so that an excellent state of dispersing with the polymers having the low molecular weight is realized.

It is preferable that the high-molecular-weight component for forming the binder resin according to the present invention contains a reactive polar group in a range in which the acid number is larger than 3.0, more preferably 5.0 or more. On the other hand, the preferred acid number of the low-molecular-weight component is 3.0 or less. By causing the high-molecular-weight component to have an acid number larger than a predetermined value, a sufficient crosslinked structure can be formed. Therefore, various problems occurring due to the unsatisfactory offset resistance and the adverse dispersion characteristics of the other components in toner particles can be dissolved satisfactorily. Further, the low acid number of the low-molecular-weight component enables excellent fixation characteristics.

As the polymer component according to the present invention, having the polar group and capable of forming the crosslinking bond, a polymer having one or more types of groups selected from a group consisting of a carboxylic group, a carboxylic acid anhydride and a carboxylic base. The monomer containing the carboxylic group for synthesizing the vinyl polymer is represented by acrylic type acid, such as acrylic acid, methacrylic acid, α-ethylacrylic acid or crotonic acid; α- or β-alkyl derivative of the acrylic acid; unsaturated dicarboxylic acid, such as fumaric acid, maleic acid or citraconic acid; and monoester derivative of the unsaturated dicarboxylic acid; and maleic acid anhydride. By causing the foregoing monomer solely or in a monomer mixture to copolymerize with another monomer, a desired polymer can be prepared. In particular, it is preferable to employ the monoester derivative of the unsaturated dicarboxylic acid.

The monomer having the carboxylic group for use in the present invention is represented by monoester of α,β-unsaturated dicarboxylic acid, such as monomethyl maleate, monoethyl maleate, monobutyl maleate, monooctyl maleate, monoaryl maleate, monophenyl maleate, monomethyl fumarate, monoethyl fumarate, monobutyl fumarate or monophenyl fumarate; monoester of alkenyl dicarboxylic acid, such as n-butenyl monobutyl succinate, n-octenyl monomethyl succinate, n-butenyl monoethyl maleate, n-dodecenyl monomethyl glutamate or n-butenyl monobutyl adipitate; and monoester of aromatic dicarboxylic acid, such as monomethyl phthalic ester, monoethyl phthalic ester or monobutyl phthalic ester.

The monomer containing the carboxylic group may be added to 1 to 30 wt % of all monomers forming the high-molecular-weight component of the binder resin, preferably 3 to 20 wt %.

The reason why the monoester monomer of the dicarboxylic acid is selected is that the form of an acid monomer having a high solubility is inadequate with respect to the aqueous suspending solution when the suspension polymerization is performed. It is preferable to use the ester having a low solubility.

The carboxylic group and the carboxylic acid ester components in the copolymer obtained as described above may be subjected to an alkali process to be saponified. That is, it is preferable that the portions are caused to react with the cation components of the alkali to change the carboxylic acid group or the carboxylic acid ester portion to a polar functional group. If the carboxylic group, which reacts with the metal-contained compound, is contained in the high-molecular-weight component of the binder resin, the carboxylic group brought into the anhydrous state (that is, in a state of a closed ring) deteriorates the crosslinking efficiency.

The alkali process may be performed in such a manner that the alkali formed into a water solution is injected into a solvent used at the polymerization process after the binder resin has been manufactured while stirring the solution. The alkali that can be used in the present invention is represented by hydroxides of alkali metal or alkaline earth metal, such as Na, K, Ca, Li, Mg or Ba; hydroxides of transition metals such as Zn, Ag, Pb or Ni; hydroxides of class-four ammonium salts, such as ammonium salt or pyridium salt. In particular, it is preferable to employ NaOH or KOH.

The necessity of subjecting the overall body of the carboxylic acid group and the carboxylic ester portion in the copolymer to the saponification process can be omitted. The necessity is that the saponification proceeds partially as to convert them to the polar functional group.

It is difficult to simply determine the quantity of the alkali for use in the foregoing saponification process because it depends upon the type of the polar group in the binder resin, the dispersing method and the type of the component monomer. However, the quantity is preferable to be 0.02 to 5 times equivalent to the acid value of the binder resin. If the quantity is smaller than 0.02 times equivalent, the saponification does not proceed satisfactorily, causing the number of the polar functional groups, that can be generated due to the reactions, to be decreased. As a result, the ensuing crosslinking reactions cannot be allowed to proceed sufficiently. If the quantity exceeds 5 times equivalent, hydrolysis of the ester and generation of salt due to the saponification adversely affect the functional groups in the carboxylic acid ester portion.

When the alkali process using 0.02 to 5 times equivalent is performed, the concentration of the residual cation ions is 5 to 1000 ppm after the process has been completed. Therefore, the quantity of the alkali can preferably be determined.

The low-molecular-weight component in the binder resin according to the present invention may be prepared by a known method. However, the bulk polymerization enables the low-molecular-weight polymer by performing the polymerization at high speed to raise the reaction stoppage rate. However, the foregoing method encounters a problem that the reactions cannot easily be performed. However, the solution polymerizing method utilizes the difference in the chain transfer of the radical occurring due to the solvent to adjust the quantity of the polymerization initiator and the reaction temperature so that the low-molecular-weight component can easily be obtained under moderate conditions. Therefore, the method is preferable to obtain the low-molecular-weight component in the resin composition according to the present invention. In particular, the solution polymerization method to be performed under pressure is an effective method to minimize the quantity of the polymerization initiator to prevent satisfactorily the influence of the polymerization initiator.

The monomer or comonomer for obtaining the high-molecular-weight component of the binder resin for use in the toner according to the present invention and the monomer or the comonomer for obtaining the low-molecular-weight component is represented by the following vinyl monomers.

Any one of the following materials may be selected from the group consisting of: styrene, styrene derivative represented by o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene and p-n-dodecylstyrene; ethylene unsaturated mono olefin represented by ethylene, propylene, butylene or isobutylene; unsaturated polyene such as butadiene; vinyl halide such as vinyl chloride, vinylidene chloride, vinyl bromide or vinyl fluoride; vinyl ester such as vinyl acetate, vinyl propionate or vinyl benzoate; α-methylene aliphatic monocarboxylic ester such as methyl methacrylate, ethyl methacrylate, propyl methacrylate, n-butyl methacrylate, isobutyl methacrylate, n-octvl methacrylate, dodecyl methacrylate, 2-ethylhexyl methacrylate, stearyl methacrylate, phenyl methacrylate, dimethyl aminoethyl methacrylate or diethyl aminoethyl methacrylate; acrylic acid ester, such as methyl acrylate, ethyl acrylate, n-butyl acrylate, isobutyl acrylate, propyl acrylate, n-octyl acrylate, dodecyl acrylate, 2-ethyl hexyl acrylate, stearyl acrylate, 2-chloroethyl acrylate or phenyl acrylate; vinyl ether, such as vinyl methyl ether, vinyl ethyl ether or vinyl isobutyl ether; vinyl ketone, such as vinyl methyl ketone, vin,l hexylketone or methyl isopropenyl ketone; vinyl compounds such as N-vinyl pyrrole, N-vinyl carbazole, N-vinyl indole or N-vinyl pyrolidone; vinyl naphthalene; acrylic acid or methacrylic acid derivatives such as acrylonitrile, methacrylonitrile or acrylamide.

Among the foregoing materials, it is preferable to use a combination of monomers arranged to form a styrene copolymer or styrene acrylic copolymer.

The previous solution of the high-molecular-weight component and the polyolefin wax and the solution of the low-molecular-weight polymer for use to manufacture the binder resin according to the present invention may be used in such a manner that the resin manufactured by the selected method is dissolved in the foregoing solvent or the reactant solution in the state where the polymerization has been completed and is used as it is. It is preferable that the solution of the low-molecular-weight polymer is used as it is to reduce the quantity.

The preferable concentration of the solid component in the polymer solution is 5 to 70 wt % or less to improve the dispersion efficiency, prevent denaturing of the resin at the time of stirring and improve operation easiness. It is preferable that the concentration of the solid component in the high-molecular-weight polymer component and the previous solution of the polyolefin wax is 5 to 60 wt %. The preferred concentration of the solid component in the low-molecular-weight polymer is 5 to 70 wt %.

The high-molecular-weight polymer component and the polyolefin wax may be dissolved or dispersed by stirring and mixing. For example, a batch type method or a continuous method is employed.

The low-molecular-weight polymer solution is mixed in such a manner that 10 to 1000 parts by weight of the low-molecular-weight polymer solution with respect to 100 parts by weight of the foregoing previous solution are added and they are stirred to be mixed with each other.

As the organic solvent for use at the time of mixing the solutions of the resin composition according to the present invention, any one of the following materials is preferably selected: hydrocarbon solvent such as benzene, toluene, xylene, #1 solvent naphtha, #2 solvent naphtha, #3 solvent naphtha, cyclohexane, ethylbenzene, solvesso 100, solvesso 150 or mineral spirit; alcohol solvent such as methanol, ethanol, iso-propylalcohol, n-butylalcohol, sec-butylalcohol, iso-butylalcohol, amylalcohol or cyclohexanol; ketone solvent such as acetone, methylethyl ketone, methyl isobutyl ketone or cyclohexane; ester solvent such as ethyl acetate, n-butyl acetate or cellosolve acetate; and ether solvent such as methyl cellosolve, ethyl ceilosolve, butyl cellosolve or methyl carbitol. Among the foregoing materials, it is preferable to use the aromatic solvent, ketone solvent or ester solvent. The foregoing materials may arbitrarily be mixed.

The organic solvent may be removed by a method comprising the steps of heating the organic solvent solution of the polymer is heated; removing 10 to 80 wt % of the organic solvent under room pressure, and removing the residual solvent under reduced pressure. It is preferable at this time that the organic solvent solution is maintained at a temperature range from the boiling point of the organic solvent to 200° C. If the temperature is lower than the boiling point of the organic solvent, the efficiency of removing the solvent by distillation becomes unsatisfactory. What is worse, unnecessary shearing force acts on the polymer in the organic solvent or the re-separation of the respective component polymers is enhanced, causing micro phase-separation to easily take place. If the temperature is higher than 200° C., depolymerization of the polymer proceeds. As a result, the breakages of the molecules cause the oligomer to be generated, and generation of monomers causes the residual monomers to be present in the produced resin. In this case, an adverse result takes place when serving as the toner binder for electrophotography.

The resin composition for the toner obtained by the foregoing manufacturing method contains the low-molecular-weight wax which exhibits excellent dispersion facility. In addition, an excellent compatibility of the low-molecular-weight polymer and the high-molecular-weight polymer can be realized. As a result, a significant improvement can be realized as compared with the conventional method.

It is preferable that a reactive metal compound be added to the toner according to the present invention to enhance crosslinking between polymer chains of the resin composition at the time of manufacturing the toner.

Among various reactive metal compounds, an organic metal compound will enable an excellent effect to be obtained because it exhibits excellent compatibility and the dispersion characteristics with respect to the polymer, and therefore crosslinking due to reactions with the metal compound proceeds uniformly in the polymer.

Among the reactive organic metal compounds, use of a material containing an organic compound exhibiting excellent vaporization and sublimation as a ligand or ion pair will enable an advantage to be obtained. An organic compound having the foregoing characteristics is preferably selected from among the organic compounds for forming the ligands and ion pairs with metal ions. The organic compound for forming the organic metal compound is represented by salicylic acid and its derivative, for example, salicylic acid, salicylamide, salicylamine, salicylaldehyde, salicylic salicylate or di-tert-butyl salicylate; β-ketone such as acetyl acetone or propionacetone; and low-molecular-weight carboxylate such as acetate or propionate.

A metal complex may have a characteristic for controlling the charge of the toner particle. The metal complex of the foregoing type is represented by an azo-type metal complex expressed by general formula [I].

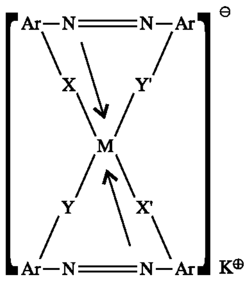

Formula [I]

wherein M is center metal of coordination represented by Cr, Co, Ni, Mn or Fe having a coordination number of 6, Ar is aryl group represented by a phenyl group or a naphthyl group and may have a substitution group which is represented by a nitro group, a halogen group, a carboxylic group, an anilide group, an alkyl group or an alkoxy group having 1 to 18 carbon atoms, X, X', Y and Y' are each —O—, —CO—, —NH—, —NR— (R is an alkyl group having 1 to 4 carbon atoms), $K^+$ is a hydrogen ion, a sodium ion, a potassium ion, an ammonium ion or an aliphatic ammonium ion.

The complex will now be specifically described.

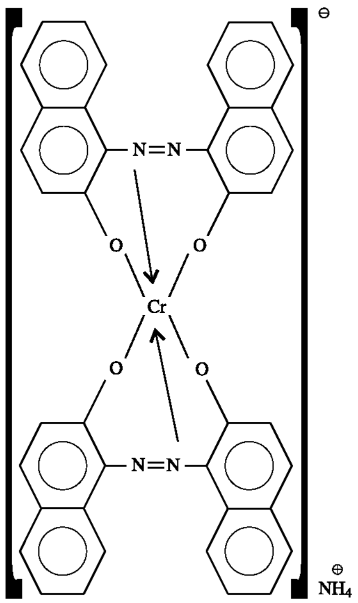

[I]-1

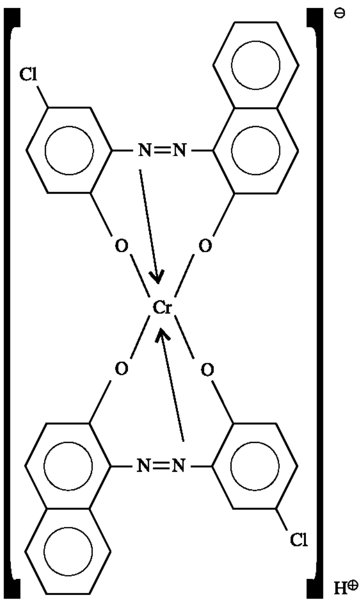

[I]-2

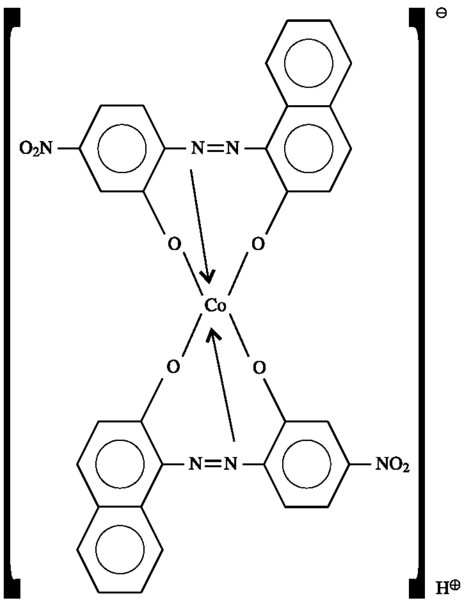

[I]-3

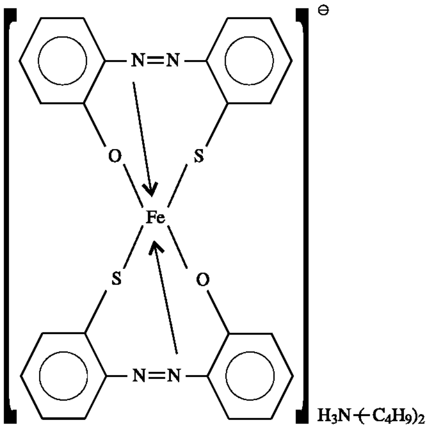

[I]-4

-continued

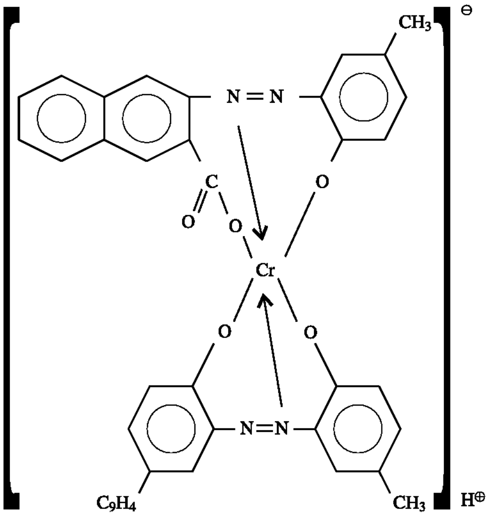

[I]-5

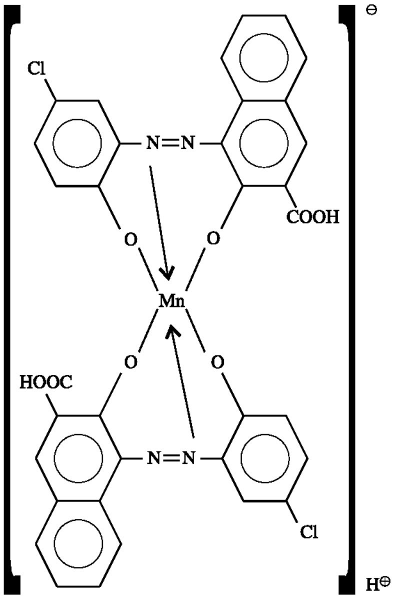

[I]-6

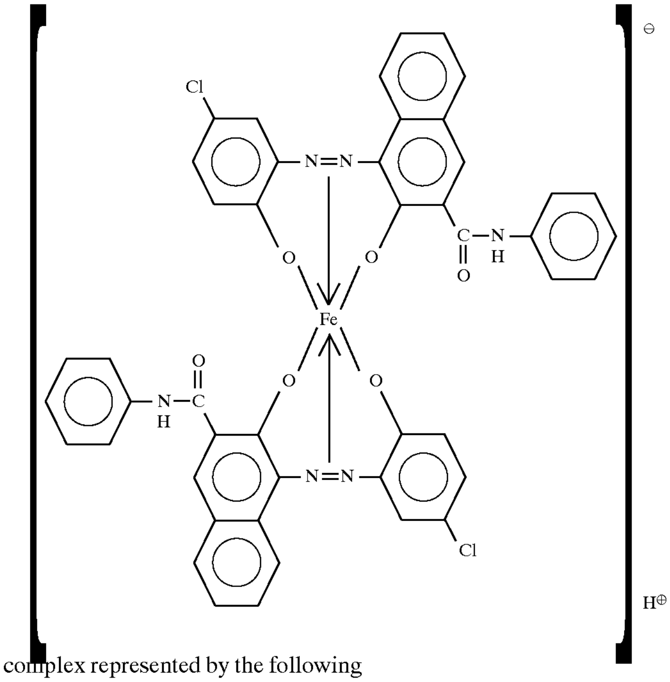

[1]-7

Basic organic metal complex represented by the following general formula [II] have the negative charging characteristics and therefore they can be used in the present invention.

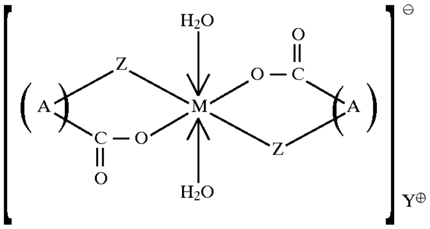

Formula [II]

wherein M is central metal of the coordination and represented by Cr, Co, Ni, Mn or Fe having a coordination number of 6, A is

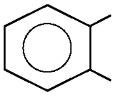

(may have a substitution group such as an alkyl group),

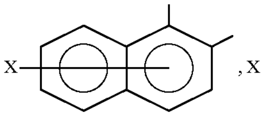

,

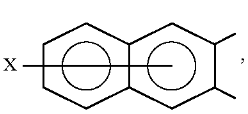

,

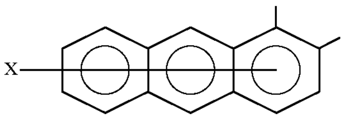

,

-continued
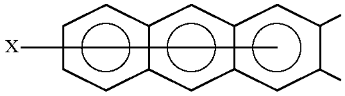
wherein X is a hydrogen atoms, halogen atoms or a nitro group, and
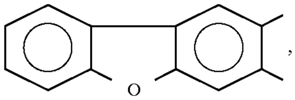
,
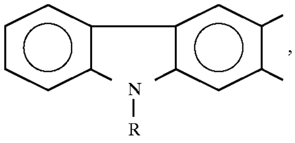
,
-continued
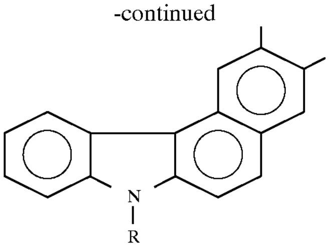
wherein R is a hydrogen atom, alkyl having 1 to 18 carbon atoms or an alkeyl group, $Y^{\oplus}$ is a hydrogen atom, a sodium ion, a potassium ion, an ammonium ion or aliphatic ammonium ion, Z is —O— or
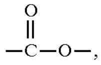
,
The foregoing complex will now be described.
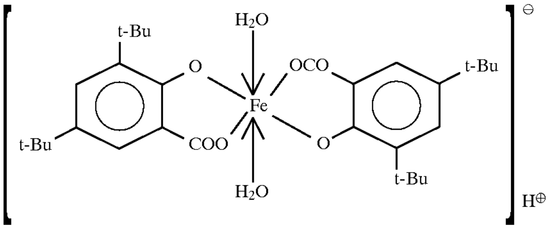
[II]-1
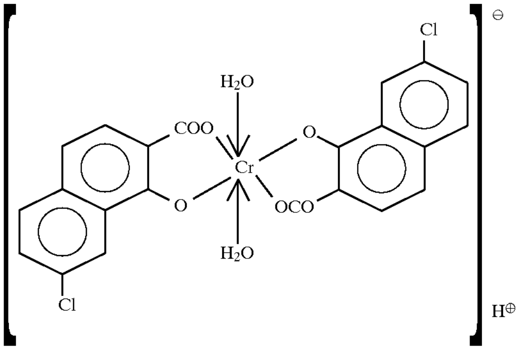
[II]-2
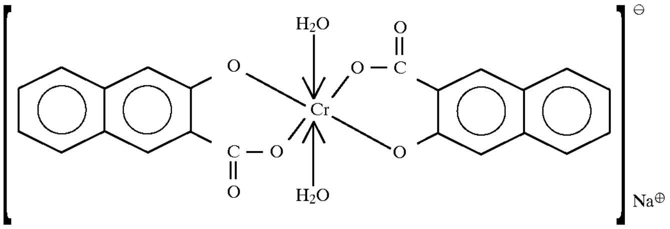
[II]-3
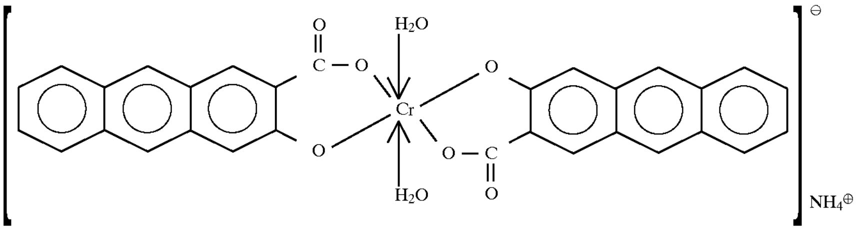
[II]-4

-continued

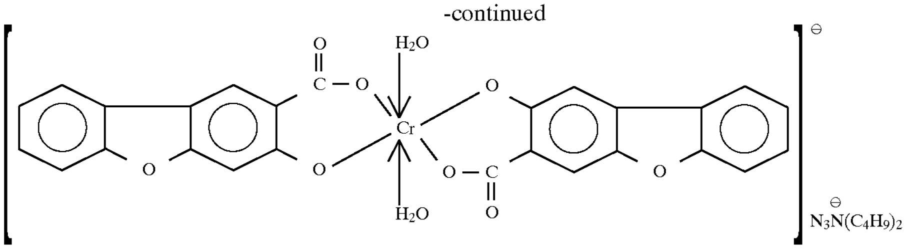

[II]-5

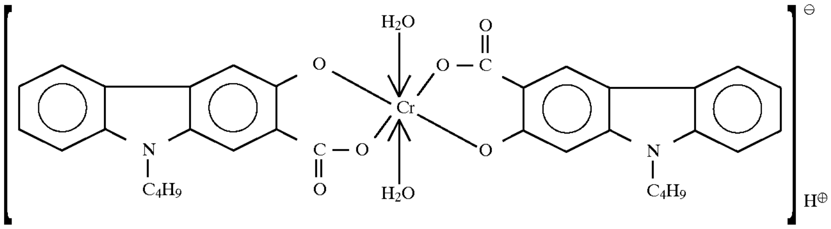

[II]-6

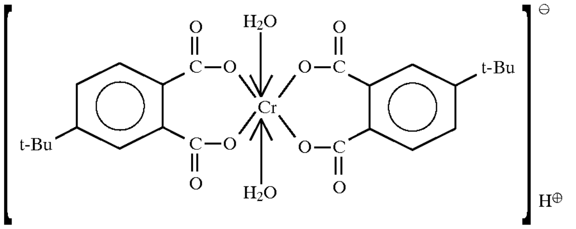

[II]-7

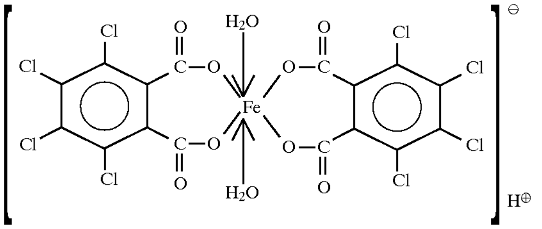

[II]-8

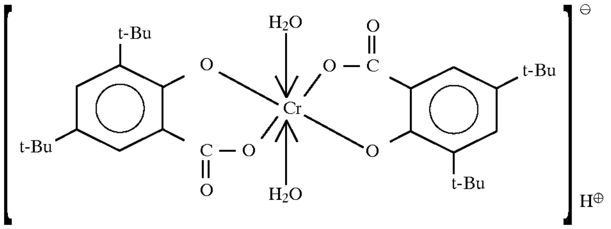

[II]-9

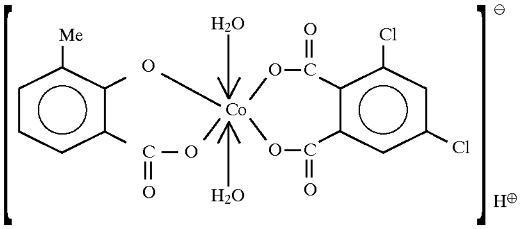

[II]-10

The foregoing metal complex may be used solely or two or more types may be combined.

The quantity of the metal complex to be added to toner particles differs depending upon the type of the toner binder, whether or not the carrier is used, the pigment for coloring the toner and the reactivity of the metal complex with respect to the binder. The metal complex is preferably used by 0.01 to 20 parts by weight with respect to 100 parts by weight of the binder resin, preferably 0.1 to 10 parts by weight.

When the metal complex is caused to react with the binder resin at the time of dissolving and kneading the same with the binder resin, decomposition facility, reactivity, compatibility with the binder resin and the dispersion characteristics into the binder resin can be improved, and stable charging characteristics to serve as toner can be obtained as compared with the case where the same is added at the time of synthesizing the binder resin.

Although the present invention may be arranged in such a manner that the metal compound serving as the crosslinking component is caused to have the charge controlling characteristics to serve as the toner, a charge controller may be added individually.

The charge controller known in the subject industrial field of the present invention will now be described.

The following substances may be used to control the toner to be negatively charged.

For example, an organic metal complex or a chelate compound may be used as an effective material. The metal complex of the following types may be employed: monoazo metal complex, acetyl acetone metal complex, aromatic hydroxycarboxylic acid and aromatic dicarboxylic acid. Further, the following substances may be used: aromatic hydroxy carboxylic acid, aromatic mono or polycarboxylic acid and its metal salt, anhydride substance or ester; and a phenol derivative such as bisphenol.

The following substances may be used to control the toner to be positively charged.

For example, a substance denatured with nigrosine and aliphatic acid metal salt; ammonium salt such as tributyl benzyl ammonium-1-hydroxy-4-naphthosulfonic acid salt or tetrabutyl ammonium tetrafluoroborate; onium salt such as phosphonium salt which is an analog of the foregoing class-four ammonium salt and chelate pigment of the onium salt; triphenylmethane dye and its chelate pigment (as the lake agent, tungstophosphoric acid, phosphomolybdic acid, phosphotungstomolybdenum acid, tannic acid, lauric acid, gallic acid, ferricyanide substance or ferrocyanide substance may be used); metal salt of higher alcohol; acetylacetone metal complex; diorganotinoxide such as dibutyltinoxide, dioctyltinoxide or dicyclohexyltinoxide; and diorganotinborate such as dibutyltinborate, dioctyltinborate or dicyclohexyltinborate. The foregoing substances may be used solely or they may be mixed. Among the foregoing substances, the nigrosine charge controller or the ammonium salt charge controller is preferably used.

The toner according to the present invention is preferable to contain inorganic fine powder to improve the charge stability, the development easiness, fluidity and durability.

The inorganic fine powder for use in the present invention is exemplified by silica fine powder, titanium oxide fine powder and alumina fine powder. Among the foregoing powders, it is preferable to use a powder having a specific surface area of 30 $m^2/g$ or more (more preferably 50 to 400 $m^2/g$) measured by a BET method using the nitrogen absorption. The preferred quantity of the inorganic fine powder is 0.01 to 8 parts by weight, preferably 0.1 to 5 parts by weight with respect to 100 parts by weight of the toner.

It is also preferable that the inorganic fine powder for use in the present invention is, if necessary, subjected to a process using treatment material, such as silicon varnish, various denatured silicon varnish, silicon oil, various denatured silicon oil, silane coupling agent, silane coupling agent having a functional group, other organic silicon compound or the like to be hydrophobic or to control the charging characteristics.

The other additive is exemplified by a lubricating agent, such as Teflon, zinc stearate or polyvinylidene fluoride (polyvinylidene fluoride is the most preferable material); abrasive material such as selenium oxide, silicon carbide or strontium titanate (strontium titanate is the most preferable material); a fluidity imparting agent, such as titanium oxide or aluminum oxide (the hydrophobic material is the most preferable material); a caking preventive agent; a conductance imparting agent such as carbon black, zinc oxide, antimony oxide or tin oxide; a development enhancing agent, such as white particle or black particle, having an inverse polarity to that of the toner particles.

The toner according to the present invention is used while being mixed with powder of the carrier if it is used as a binary-system developer. In this case, the toner concentration ratio of the mixture of the toner and the carrier powder is 0.1 to 50 wt %, more preferably 0.5 to 10 wt % and most preferably 3 to 5 wt %.

The carrier according to the present invention may be any on of known carriers. For example, powder having magnetism such as iron powder, ferrite powder or nickel powder; or the foregoing material having the surface processed with a fluorine-type resin, vinyl resin or silicon resin may be used.

The toner according to the present invention may be caused to contain magnetic material to serve as magnetic toner. In this case, the magnetic material also serves as a coloring agent. The magnetic material that can be contained in the magnetic toner according to the present invention may be any one of the following materials selected from a group consisting of: iron oxide such as magnetite, hematite or ferrite; metal such as iron, cobalt or nickel; and alloy or mixture of the foregoing metal such as aluminum, cobalt, lead, magnesium, tin, zinc, antimony, berylium, bismuth, cadmium, calcium, manganese, selenium, titanium, tungsten or vanadium.

The average particle size of the magnetic substance is 0.1 to 2 $\mu$m, preferably 0.1 to 0.5 $\mu$m. The quantity of the magnetic substance to be contained in the toner is about 20 to 200 parts by weight with respect to 100 parts by weight of the resin component, more preferably 40 to 150 parts by weight with respect to 100 parts by weight of the resin component.

The preferred magnetic characteristics when a magnetic field of 10K oersted is applied are as follows: the coerceive force is 20 to 250 oersteds, saturated magnitization is 50 to 200 emu/g and residual magnetization is 2 to 20 emu/g.

The coloring agent for use in the toner according to the present invention is exemplified by an arbitrary pigment or a dye. The pigment is exemplified by carbon black, an aniline black, acetylene black, naphthol yellow, Hansa yellow, rhodamine lake, alizarin lake, iron oxide red, phthalocyanine blue and indanthrene blue. The foregoing material is used in a quantity required to maintain the optical density of the fixed image, such that 0.1 to 20 parts by weight, preferably 2 to 10 parts by weight with respect to 100 parts by weight of resin. The dye may be azo dye, anthraquinone dye, xanthene dye or methine dye. The dye is added by 0.1 to 20 parts by weight, preferably 0.3 to 3 parts by weight with respect to 100 parts by weight of the resin.

The toner for developing an electrostatic image according to the present invention is manufactured by a method comprising the steps of: sufficiently mixing the resin composition, the metal compound, the pigment or dye serving as the coloring material, the magnetic substance, the charge controller if necessary and other additives by a mixer such as a Henschel mixer or a ball mill; using a heat kneader such as hot rolls, a kneader or an extruder to melt, mix and mill the material as to dissolve the metal compound, the pigment, the dye and the magnetic substance in the binder resin; and crushing and separating them after they have been solidified by cooling.

If necessary, a desired additive may be mixed (added) by a mixer, such as the Henschel mixer so that the toner for developing an electrostatic image according to the present invention is obtained.

The present invention may employ a usual kneading method in a kneading process after the pre-mixing process has been completed. In particular, the performance of the binder resin according to the present invention can be maintained and excellent dispersion characteristics and wettability with the other additive can be realized by a machine having a mono-axial or biaxial screws. In particular, an extruder machine may preferably be employed. In this case, the ratio (L/D) of the length (L) of the kneading axis and the diameter (D) of the extruder is made to be 10 to 60 in the melting and kneading process. The reason for this lies in that the viscosity of the molten binder resin is efficiently lowered at the time of melting and kneading the binder resin to prevent action of excessive shearing force over the force required to disperse the toner components in the resin so that the re-aggregation of the binder components and the breakage of the molecular chains, and in particular, the high molecular component are satisfactorily prevented. If kneading is performed while making L/D to be less than 10, the viscosity of the molten binder cannot satisfactorily be lowered. Therefore, desired wettability with the foregoing additive forming the toner cannot be realized. In this case, the dispersion cannot be performed satisfactorily, and, what is worse, excessive shearing force acts on the binder resin, causing a problem to arise in that the high molecular chains can be broken. If the ratio L/D is higher than 60, the viscosity of the molten binder resin is lowered excessively, causing sometimes the dispersion of the other additive to become undesirable or the phase of the high molecular weight component of the binder to be separated. The foregoing trends become excessive if magnetic toner, such as the magnetic material, containing an additive having a large difference in the specific gravity from that of the binder resin is used. Therefore, it is preferable to make the ratio L/D to be 15 to 55.

By specifying the kneading conditions as described above, change of the molecular weight of the resin composition occurring when the toner is manufactured can be minimized.

Preferred examples of the present invention will now be described. However, the present invention is not limited to the descriptions below.

RESIN COMPOSITION MANUFACTURING EXAMPLE 1

Synthesis of Low-Molecular-Weight Polymer (L-1)

300 parts by weight of xylene was injected into a 4-port flask, and the space in the flask was substituted by nitrogen gas while stirring the xylene. Then, the temperature was raised to reflux the material.

While refluxing the material, a mixture solution of 87 parts by weight of styrene, 13 parts by weight of n-butyl acrylate and 2, parts by weight of di-tert-butylperoxide was dripped for four hours. Then, the solution was allowed to stand for 2 hours, so that polymerization was completed. As a result, a solution of a low- molecular-weight polymer (L-1) was obtained.

A portion of the polymer solution was sampled, it was dried at a reduced pressure, and the GPC and the glass transition point (Tg) of the obtained low-molecular-weight polymer (L-1) were measured. As a result, the weight average molecular weight (Mw) was 9,900, the number average molecular weight (Mn) was 6,200, the molecular weight (PMw) of the maximal value in the GPC was 8,800 and Tg was 65° C.

The polymerization rate was 97%.

Synthesis of High-Molecular-Weight Polymer (H-1)

180 parts by weight of degasified water and 20 parts by weight of a solution containing 2 wt % polyvinyl alcohol were injected into a four-port flask, and then a mixture of 70 parts by weight of styrene, 25 parts by weight of n-butyl acrylate, 5 parts by weight of monobutyl maleate, 0.005 parts by weight of divinylbenzene and 0.1 parts by weight of 2,2-bis (4,4-di-tert-butylperoxycyclohexyl) propane (temperature at a half life of 10 hours was 92 C.) was added, and stirred, so that a suspension was obtained.

The space in the flask was sufficiently substituted by nitrogen gas, and the temperature was raised to 85° C., so that polymerization was commenced. The temperature was maintained for 24 hours, and 0.1 parts by weight of benzoylperoxide (the temperature of the half life of 10 hours was 72° C.) was added. Then, the solution was maintained for 12 hours, so that the polymerization was completed.

A NaOH solution of 2-times equivalents of the acid value (AV=7.8) of the obtained high-molecular-weight polymer (H-1) was injected into the suspension solution after the reactions therein had been completed, and they were stirred for 2 hours.

The high-molecular-weight polymer (H-1) was separated by filtration, and washed with water as to be analyzed, resulting in that Mw=1,900,000, Mn=100,000, PMw=1,000,000, Tg=62° C. and substantially no THF insoluble component was contained such that the quantity was 1.0 wt %.

Manufacturing of Resin Composition 100 parts by weight of xylene, 25 parts by weight of the high-molecular-weight polymer (H-1) and 5 parts by weight of polypropylene (Mw=6,000) were injected into a four-port flask, and then the temperature of the materials was raised. Then, they were stirred while refluxing them, so that previous dissolving was performed. The foregoing state was maintained for 12 hours, so that a uniform presolution (Y-1) of the high-molecular-weight polymer (H-1) and polypropylene was obtained.

A portion of the presolution was sampled, it was dried at a lowered pressure, and glass transition point (Tg) of the obtained solid component was measured, resulting in that it was 61° C.

On the other hand, 300 parts by weight of a uniform solution of the low-molecular-weight polymer (L-1) was injected into another container and it was refluxed.

The foregoing presolution (Y-1) and the solution of the low-molecular-weight polymer (L-1) were mixed while refluxing them, and an organic solvent was removed by distillation. The obtained resin was cooled to solidify and crush it, so that the resin composition (I) for toner was obtained.

The molecular weight of the binder resin in the resin composition (I) was measured, resulting in that two peaks were present at 9,500 and 900,000, the Mw of the high molecular weight region from the minimal value between the two peaks was 1,600,000 and the Mw/Mn of the overall resin was 48.1. A thin foil of the resin composition was observed using a video microscope (manufactured by Wilson), resulting in that no-aggregation of the high-molecular-weight component or polypropylene was observed and excellent dispersion was observed.

RESIN COMPOSITION MANUFACTURING EXAMPLE 2

200 parts by weight of xylene, 50 parts by weight of the high-molecular-weight polymer (H-1) and 5 parts by weight of polypropylene (Mw=6,000) were mixed into a four-port flask, the temperature was raised, and stirred while refluxing them, so that predissolving was performed. The foregoing state was maintained for 12 hours, so that uniform presolution (Y-2) of the high-molecular-weight polymer (H-1) and propylene was obtained.

The Tg of the solid component in the presolution was 61.5° C.

The foregoing presolution (Y-2) and 200 parts by weight of the low-molecular-weight polymer (L-1) were mixed while refluxing them, and the organic solvent was removed by distillation. The obtained resin was cold-stretched, solidified and crushed, so that the resin composition (II) for the toner was obtained.

The ratio Mw/Mn of the binder resin in the resin composition (II) was 81.2. Thin foil of the resin composition was observed similarly to Manufacturing Example 1, resulting in that excellent dispersion was confirmed.

RESIN COMPOSITION MANUFACTURING EXAMPLE 3

100 parts by weight of xylene, 10 parts by weight of the high-molecular-weight polymer (H-1) and 5 parts by weight of polypropylene (Mw=6,000) were injected into a four-port flask, and then the temperature of the materials was raised. Then, they were stirred while refluxing them, so that previous dissolving was performed. The foregoing state was maintained for 12 hours, so that a uniform presolution (Y-3) of the high-molecular-weight polymer (H-1) and polypropylene was obtained.

The Tg of the solid component in the presolution was 60.5° C.

The foregoing presolution (Y-3) and 360 parts by weight of the low-molecular-weight polymer (L-1) were mixed while refluxing them, and the organic solvent was removed by distillation. The obtained resin was cold-stretched, solidified and crushed, so that the resin composition (III) for the toner was obtained.

The ratio Mw/Mn of the binder resin in the resin composition (III) was 42.9. Thin foil of the resin composition was observed similarly to Manufacturing Example 1, resulting in that excellent dispersion was confirmed.

RESIN COMPOSITION MANUFACTURING EXAMPLE 4

Presolution (Y-4) was prepared similarly to Example 1 except that 10 parts by weight of polyethylene (Mw=30,000) was used in place of polypropylene at the time of preparing the presolution for manufacturing the resin composition, and then resin composition (IV) for the toner was obtained.

The Tg of the solid component in the presolution was 60.5° C.

The ratio Mw/Mn of the binder resin in the resin composition (IV) was 51.7. Thin foil of the resin composition was observed similarly to Manufacturing Example 1, resulting in that excellent dispersion was confirmed.

RESIN COMPOSITION MANUFACTURING EXAMPLE 5

Synthesis of Low-Molecular-Weight Polymer (L-2)

300 parts by weight of xylene were injected into a glass autoclave, the space in the container was sufficiently substituted with nitrogen gas while stirring them, the container was hermetically closed, and the temperature was raised to 200° C.

While maintaining the foregoing temperature and the pressurizing and refluxing state, a mixture solution of 70 parts by weight of styrene and 2 parts by weight of di-tert-butylperoxide was dripped for 2.5 hours, and then the solution was maintained for one hour, so that the polymerization was completed, so that the low-molecular-weight polymer (L-2) was obtained.

A portion of the polymer solution was sampled, it was dried at a lowered pressure, and the low-molecular-weight polymer (L-2) were analyzed. As a result, Mw was 6,000, Mn was 3,200, PMw was 4,500 and Tg was 64° C. The polymerization rate at this time was 98%.

Synthesis of High-Molecular-Weight Polymer (H-2)

High-molecular-weight polymer (H-2) was obtained similarly to the method for synthesizing the high-molecular-weight polymer (H-1) according to the manufacturing example 1 except for that the divinyl benzene was used in a quantity of 0.01 parts by weight.

The obtained high-molecular-weight polymer (H-2) was analyzed, resulting in that Mw was 2,700,000, Mn was 180,000, Tg was 63° C., AV=7.2 and the insoluble THF was 7 wt %.

Manufacturing of Resin Composition 100 parts by weight of xylene, 30 parts by weight of the high-molecular-weight polymer (H-2) and 5 parts by weight of polypropylene (Mw=6,000) were injected into a four-port flask, and then the temperature of the materials was raised. Then, they were stirred while refluxing them, so that previous dissolving was performed. The foregoing state was maintained for 12 hours, so that a uniform presolution (Y-5) of the high-molecular-weight polymer (H-2) and polypropylene was obtained.

A portion of the presolution was sampled, it was dried at a reduced pressure, and glass transition point of the obtained solid component was measured, resulting in that it was 62° C.

On the other hand, 300 parts by weight of a uniform solution of the low-molecular-weight polymer (L-2) was injected into another container and it was refluxed.

The foregoing presolution (Y-5) and the solution of the low-molecular-weight polymer (L-2) were mixed while refluxing them, and an organic solvent was removed by distillation. The obtained resin was cooled to solidify and crush it, so that the resin composition (V) for toner was obtained.

The molecular weight of the binder resin in the resin composition (V) was measured, resulting in that two peaks were present at 5,000 and 1,100,000, the Mw of the high molecular weight region from the minimal value between the two peaks was 2,100,000 and the Mw/Mn of the overall resin was 116.9. A thin foil of the resin composition was observed, resulting in that excellent dispersion was observed.

RESIN COMPOSITION MANUFACTURING EXAMPLE 6

Synthesis of Low-Molecular-Weight Polymer (L-3)

Low-molecular-weight polymer (L-3) was obtained similarly to the method for synthesizing the low-molecular-weight polymer (L-1) according to the manufacturing example 1 except for that 84 parts by weight of styrene, 16 parts by weight of n-butyl acrylate and 6 parts by weight of di-tert-butylperoxide were used.

A portion of the polymer solution was sampled, it was dried at a reduced pressure, and then the obtained low-molecular-weight polymer (L-3) was analyzed, resulting in that Mw was 20,000, Mn was 12,000, PMw=18,000 and Tg was 63° C. The invert ratio of the polymer was 97%.

Synthesis of High-Molecular-Weight Polymer (H-3)

High-molecular-weight polymer (H-3) was obtained similarly to the method for synthesizing the high-molecular-weight polymer (H-1) according to the manufacturing example 1 except for that the divinyl benzene was used in a quantity of 0.01 wt %.

The obtained high-molecular-weight polymer (H-3) was analyzed, resulting in that Mw was 1,420,000, Mn was 40,000, PMw=650,000, Tg was 62° C., AV=7.6 and substantially no insoluble THF was present.

Manufacturing of Resin Composition 100 parts by weight of xylene, 10 parts by weight of the high-molecular-weight polymer (H-3) and 5 parts by weight of polypropylene (Mw=6,000) were injected into a four-port flask, and then the temperature of the materials was raised. Then, they were stirred while refluxing them, so that previous dissolving was performed. The foregoing state was maintained for 12 hours, so that a uniform presolution (Y-6) of the high-molecular-weight polymer (H-3) and polypropylene was obtained.

A portion of the presolution was sampled, it was dried at a reduced pressure, and glass transition point (Tg) of the obtained solid component was measured, resulting in that it was 61° C.

On the other hand, 300 parts by weight of a uniform solution of the low-molecular-weight polymer (L-3) was injected into another container and it was refluxed.

The foregoing presolution (Y-6) and the solution of the low-molecular-weight polymer (L-3) were mixed while refluxing them, and an organic solvent was removed by distillation. The obtained resin was cooled to solidify and crush it, so that the resin composition (VI) for toner was obtained.

The molecular weight of the binder resin in the resin composition (VI) was measured, resulting in that two peaks were present at 20,000 and 600,000, the Mw of the high molecular weight region from the minimal value between the two peaks was 1,310,000 and the Mw/Mn of the overall resin was 35.3. A thin foil of the resin composition was observed by a method similar to manufacturing example 1, and an excellent dispersion was seen.

RESIN COMPOSITION COMPARATIVE MANUFACTURING EXAMPLE 1

Synthesis of Low-Molecular-Weight Polymer (H-4)

180 parts by weight of degasified water and 20 parts by weight of an aqueous solution containing 2 wt % polyvinyl alcohol were injected into a four-port flask, and then a mixture of 70 parts by weight of styrene, 25 parts by weight of n-butyl acrylate and 0.1 parts by weight of 2,2-bis (4,4-di-tert-butylperoxycyclohexyl) propane was added, and stirred, so that a suspension was obtained.

The space in the flask was sufficiently substituted by nitrogen gas, and the temperature was raised to 85° C., so that polymerization was commenced. The temperature was maintained for 24 hours, so that the polymerization was completed.

The obtained high-molecular-weight polymer (H-4) was separated by filtration, washed with water and dried, and then it was analyzed, resulting in that Mw=700,000, Mn=30, 000, PMw 500,000, Tg=64° C. and AV=1.1.

Manufacturing of Resin Composition 300 parts by weight of xylene, 75 parts by weight of the low-molecular-weight polymer (L-1), 25 parts by weight of the high-molecular-weight polymer (H-4) and 5 parts by weight of polypropylene (Mw=6,000) were collectively injected into a four-port flask, and then the temperature of the materials was raised. Then, they were stirred and mixed for 24 hours while refluxing them. The organic solvent was removed by distillation, and the obtained resin was cold-drawn, solidified and crushed, so that comparative resin composition (i) was obtained.

Thin foil of the comparative resin composition (i) was observed similarly to manufacturing example 1, resulting in that re-aggregated substances of the high-molecular-weight polymer component were observed together with olefin component.

RESIN COMPOSITION COMPARATIVE MANUFACTURING EXAMPLE 2

Synthesis of High-Molecular-Weight Polymer (H-5)

150 parts by weight of degasified water and 15 parts by weight of an aqueous solution containing 2 wt % polyvinyl alcohol were injected into a four-port flask, and then a mixture solution of 70 parts by weight of styrene, 25 parts by weight of n-butyl acrylate and 0.07 parts by weight of 1,1-di-tert-butylperoxy-3,3,5-trimethylcyclohexane was added, and stirred, so that a suspension solution was obtained.

The space in the flask was sufficiently substituted by nitrogen gas, and the temperature was raised to 85° C., so that polymerization was commenced. The temperature was maintained for 36 hours, so that the polymerization was completed. The obtained high-molecular-weight polymer (H-6) was analyzed, resulting in that Mw=1,200,000, Mn=100,000, PMw=850,000, Tg=62° C. and the insoluble THF component was 3.5%.

Manufacturing of Resin Composition 300 parts by weight of xylene, 70 parts by weight of the low-molecular-weight polymer (L-1) and 30 parts by weight of the high-molecular-weight polymer (H-5) were collectively injected into a four-port flask, and then the temperature of the materials was raised. Then, they were stirred and mixed for 24 hours while refluxing them. The organic solvent was removed by distillation, and the obtained resin was cold-drawn, solidified and crushed, so that comparative resin composition (ii) was obtained.

EXAMPLES 1 TO 5 AND COMPARATIVE EXAMPLE 1

Each 100 parts by weight of the resin compositions (I) to (III), (V) and (VI) according to the foregoing manufacturing examples and the comparative resin composition (i) according to the comparative manufacturing example, 100 parts by weight of magnetic fine particles (average diameter: 0.2 $\mu$m) and 0.6 parts by weight of the negative charge controller (azo dye chrome complex: Complex [I]-2) were uniformly mixed. Then, they were melted and kneaded by a biaxial extruder heated to 130° C. The ratio L/D of the extruder was 29.5 The kneaded substance was cooled, and coarsely crushed by a hammer mill, and crushed by a jet mill, so that crushed substances thus-obtained were separated with wind force so that magnetic toner and comparative toner having a weight average particle size of 6.8 $\mu$m were obtained.

1.2 parts by weight of hydrophobic silica particles were dry-mixed with each 100 parts by weight of the foregoing toner, so that toner (A) to toner (E) and comparative toner (a) were obtained.

EXAMPLE 6

Similarly to Example 4, toner (F) was obtained except that the biaxial extruder set the ratio L/D to 14.8 was used to melt and knead the material.

EXAMPLE 7

Similarly to Example 5, toner (G) was obtained except that the biaxial extruder set the ratio L/D to 55.2 was used to melt and knead the material.

EXAMPLE 8

Similarly to the foregoing example, non-magnetic toner having a weight average diameter of 7.0 $\mu$m was obtained except that 100 parts by weight of the resin composition (IV) obtained in the foregoing resin composition manufacturing example, 5 parts by weight of carbon black (BET specific surface area: 130 $m^2/g$) and 3 parts by weight of negative charge controller (azo dye type iron complex: Complex [I]-7) were used and the materials were melted and kneaded by a mono-axial extruder set to a L/D of 33.7.

1.5 parts by weight of hydrophobic titanium oxide particles (BET specific surface area: 150 $m^2/g$) were dry-mixed with 100 parts by weight of the non-magnetic toner, so that toner (H) was obtained.

EXAMPLE 9

Similarly to Example 8, toner (I) was obtained except that the mono-axial extruder set the L/D to 10.4 was used to melt and knead the material.

EXAMPLE 10

Similarly to Example 8, toner (J) was obtained except that the biaxial extruder set the ratio L/D to 59.6 was used to melt and knead the material.

COMPARATIVE EXAMPLE 2

Similarly to Example 8, comparative toner (b) was prepared except that 100 parts by weight of the comparative resin composition (ii) obtained in the foregoing comparative resin composition manufacturing example, 5 parts by weight of carbon black (BET specific surface area: 130 $m^2/g$) and 3 parts by weight of negative charge controller (azo dye type iron complex: Complex [I]-7) and 4 parts by weight of polypropylene (Mw=6,000) were used.

The molecular weight distributions of the bonding resins for the toner are shown in Table 1. Also the molecular weight distributions of the obtained toner were measured, resulting in as shown in Table 2.

TABLE 1

| Example No. | Low-Molecular-Weight Polymer No. | P1Mw | MW | Mn |
|---|---|---|---|---|
| Manufacturing Example 1 | L-1 75 parts | 8,800 | 9,900 | 6,200 |
| Manufacturing Example 2 | L-1 50 parts | 8,800 | 9,900 | 6,200 |
| Manufacturing Example 3 | L-1 90 parts | 8,800 | 9,900 | 6,200 |
| Manufacturing Example 4 | L-1 75 parts | 8,800 | 9,900 | 6,200 |
| Manufacturing Example 5 | L-2 81 parts | 4,500 | 6,000 | 3,200 |
| Manufacturing Example 6 | L-3 75 parts | 18,000 | 20,000 | 12,000 |
| Comparative Manufacturing Example 1 | L-1 75 parts | 8,800 | 9,900 | 6,200 |
| Comparative Manufacturing Example 1 | L-1 70 parts | 8,800 | 9,900 | 6,200 |

| Example No. | High-Molecular-Weight Polymer No. | P2Mw | MW | Mn | Insoluble Component |
|---|---|---|---|---|---|
| Manufacturing Example 1 | H-1 25 parts | 1,000,000 | 1,900,000 | 100,000 | 1.0% |
| Manufacturing Example 2 | H-1 50 parts | 1,000,000 | 1,900,000 | 100,000 | 1.0% |
| Manufacturing Example 3 | H-1 10 parts | 1,000,000 | 1,900,000 | 100,000 | 1.0% |
| Manufacturing Example 4 | H-1 25 parts | 1,000,000 | 1,900,000 | 100,000 | 1.0% |
| Manufacturing Example 5 | H-2 25 parts | 1,200,000 | 2,700,000 | 180,000 | 1.7% |
| Manufacturing Example 6 | H-3 25 parts | 650,000 | 1,420,000 | 60,000 | Not Present |
| Comparative Manufacturing Example 1 | H-4 25 parts | 500,000 | 700,000 | 30,000 | Not Present |
| Comparative Manufacturing Example 1 | H-5 25 parts | 850,000 | 1,200,000 | 100,000 | 3.5% |

TABLE 1-continued

| Example No. | Resin Composition No. | P1Mw | P2Mw | MW/Mm | HMw |
|---|---|---|---|---|---|
| Manufacturing Example 1 | I | 9,500 | 900,000 | 48.1 | 1,600,000 |
| Manufacturing Example 2 | II | 9,800 | 960,000 | 81.2 | 1,810,000 |
| Manufacturing Example 3 | III | 9,100 | 880,000 | 42.9 | 1,540,000 |
| Manufacturing Example 4 | IV | 9,500 | 900,000 | 51.7 | 1,610,000 |
| Manufacturing Example 5 | V | 5,000 | 1,100,000 | 116.9 | 2,100,000 |
| Manufacturing Example 6 | VI | 20,000 | 600,000 | 35.3 | 1,310,000 |
| Comparative Manufacturing Example 1 | i | 9,300 | 450,000 | 30.1 | 620,000 |
| Comparative Manufacturing Example 1 | ii | 10,000 | 610,000 | 31.5 | 1,030,000 |

P1Mw: peak position in the low molecular weight region
P2Mw: peak position in the high molecular weight region
HMw: Mw in a high molecular weight region larger than 100,000

TABLE 2

| Example No. | Toner No. | P1Mw | M2Mw | Mw/Mn | HMw |
|---|---|---|---|---|---|
| Example 1 | A | 9,500 | 820,000 | 43.7 | 1,460,000 |
| Example 2 | B | 9,800 | 870,000 | 75.3 | 1,660,000 |
| Example 3 | C | 9,200 | 840,000 | 39.8 | 1,370,000 |
| Example 8 | H | 9,600 | 830,000 | 44.2 | 1.490,000 |
| Example 9 | I | 9,500 | 860,000 | 47.3 | 1,540,000 |
| Example 10 | J | 9,800 | 690,000 | 34.2 | 1,370,000 |
| Example 4 | D | 5,200 | 990,000 | 92.8 | 1,830,000 |
| Example 6 | F | 5,200 | 1,040,000 | 101.4 | 2,010,000 |
| Example 5 | E | 20,000 | 580,000 | 31.6 | 1,260,000 |
| Example 7 | G | 22,000 | 510,000 | 30.8 | 1,210,000 |
| Comparative Example 1 | a | 9,500 | 320,000 | 24.8 | 470,000 |
| Comparative Example 2 | b | 11,000 | 460,000 | 22.3 | 830,000 |

P1Mw: peak position in the low molecular weight region
P2Mw: peak position is the high molecular weight region
HMw: Mw in a high molecular weight region larger than 100,000

An image forming apparatus used in the present invention will now be described.

Referring to the drawing, reference numeral 1 represents a developing apparatus, 2 represents a developer container, 3 represents a latent-image carrier (an OPC photosensitive drum), 4 represents a transfer means, 5 represents a laser beam (or an analog light beam), 6 represents a development sleeve, 8 represents a cleaning blade, 9 represents an elastic blade, 11 represents a charging means, 12 represents a bias applying means, 13 represents magnetic toner, 14 represents a cleaning means, 15 represents a magnetic-field generating means (a magnet), 19 represents an erasing exposure, 20 represents a stay, 21 represents a heater, **21*a* represents a heater substrate, 21*b* represents a heat generator, 21*c* represents a surface protective layer, 21*d* represents a temperature detection device, 22 represents a fixing film, 23 represents a pressurizing roller, 24 represents a coil spring, 25 represents a film-end-restricting flange, 26 represents a power-supply connector, 27 represents a heat insulating member, 28 represents an inlet-port guide, and 29** represents an outlet-port guide (a separation guide).

Figure 2:
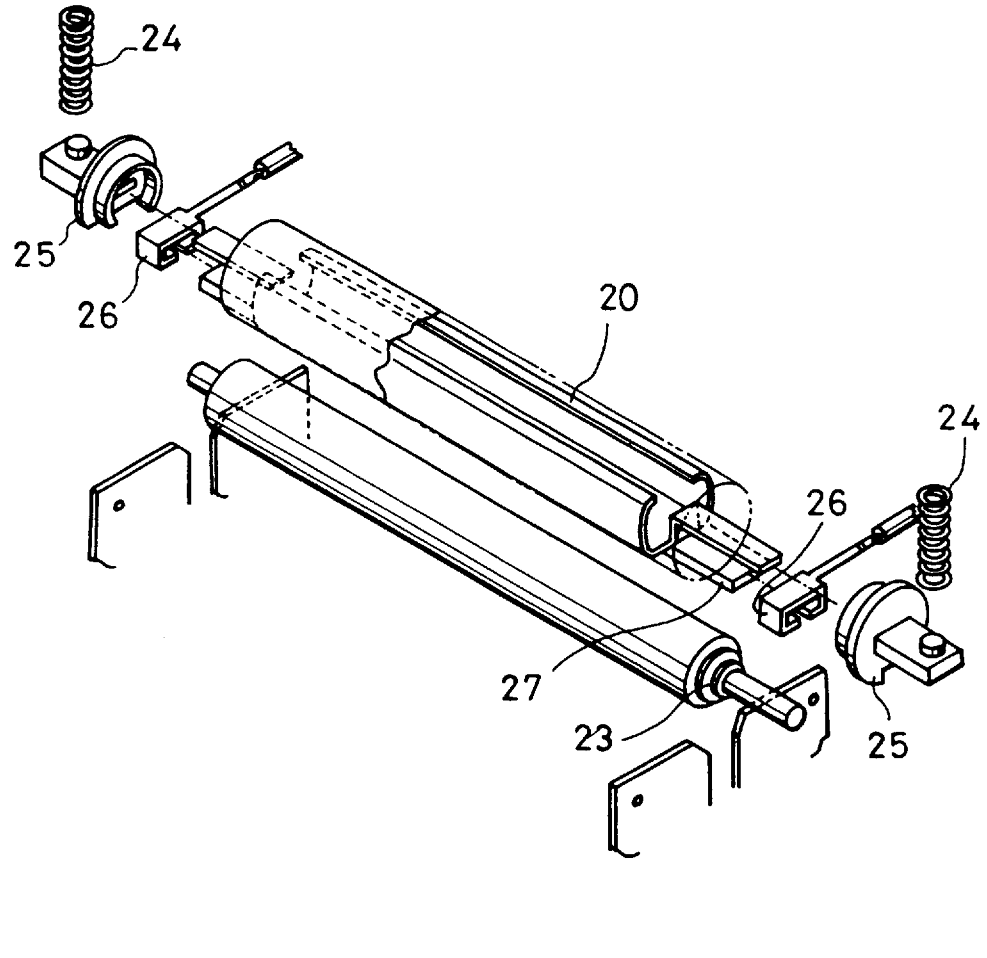
FIG. 2 is an exploded perspective view which illustrates an essential portion of a fixing apparatus adapted to embodiments of the present invention.
Figure 3:
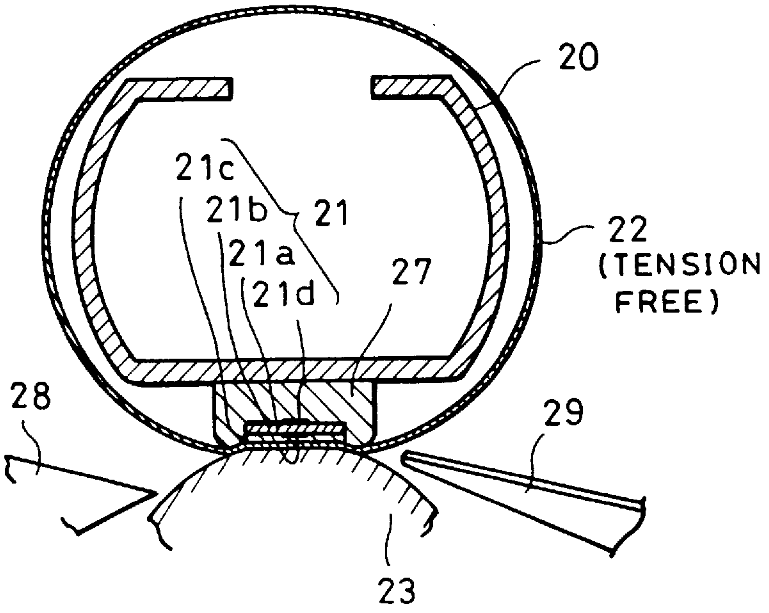
FIG. 3 is an enlarged lateral cross sectional view which illustrates an essential portion of a state of a film when the fixing apparatus adapted to the embodiments of the present invention is not operated.
Figure 4:
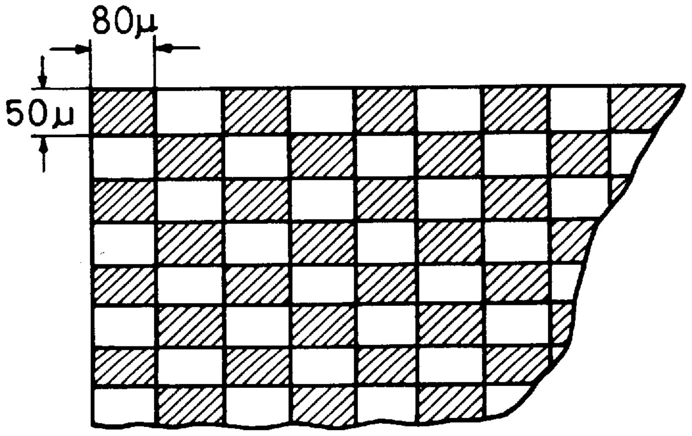
FIG. 4 is an explanatory view which illustrates a checker pattern for checking the developing characteristics of the toner.

In the present invention, a laser beam printer LBP-SX (manufactured by Canon) on the market was used such that the elastic blade 9 made of urethane rubber was fastened to the apparatus unit portion (the toner cartridge) as shown in FIG. 1 (a schematic view) and the thermal fixing unit was remodeled as shown in FIG. 2 (an exploded perspective view) and FIG. 3 (a cross sectional view) and the following conditions were employed.

The primary charge of =600 V was supplied, so that an electrostatic latent image was formed while forming a gap (300 $\mu$m) between the photosensitive drum 3 and the developer layer formed on the developer carrier 6 (including the magnet) in a non-contact manner. While applying an AC bias (f=1800 Hz and Vpp=1200 V) and a DC bias ($V_{DC}$=−400 V) to the development sleeve by the bias applying means 12, VL was made to be −150 V, so that the electrostatic image was developed by the reversal development. As a result, a toner image was formed on the OPC photosensitive member. The obtained toner image was transferred to plain paper with positive-transfer potential. The plain paper having the toner image formed thereon was passed through the heat fixing unit so that the image was fixed on the paper. At this time, the temperature of the surface of the temperature detecting device 21*d* of the heater 21 of the heat-fixing unit was 150° C., the total pressure between the heater 21 and the pressurizing roller 23 was 6 Kg and the nipple between the pressurizing roller and the film was made to be 3 mm. The fixing film 22 was made of heat-resisting polyimide film having a low-resistance separation layer in which conductive substances were dispersed in a PTEF and which was formed on the surface which came contact in the surface of the transfer member, the heat-resisting polyimide film having a thickness of 50 $\mu$m.

Under the foregoing conditions, 3,000 sheets were printed out at a printing rate of four sheets (A4 size)/minutes at room temperature and normal humidity (25° C. and 60% RH). The obtained images were evaluated as follows.

(1) Image Density

The grade of maintaining the image density was evaluated after 3,000 sheets of plain copying paper sheets (75 g/cm$^2$) had been printed out. The image density was evaluated by using a Macbeth reflecting density meter (manufactured by Macbeth) in such a manner that the white portion in which the density of the original was 0.00 with respect to the printed out image was evaluated.

Excellent: 1.40 or more

Good: 1.35 or more and not more than 1.40

Allowable: 1.00 or more and not more than 1.35

No Good: not more than 1.00

(2) Image Quality

The pattern shown in FIG. 3 was printed out and the realized dot reproducibility was evaluated.

Excellent: (number of lacking was 2 or less per 100)

Good: (number of lacking was 3 to 5 per 100)

Allowable: (number of lacking was 6 to 10 per 100)

No Good: (number of lacking 11 or more per 100)

(3) Fixation

A load of 50 g/cm$^2$ was applied, and the fixed image was rubbed with soft thin paper to evaluate the deterioration (%) of the image density before and after rubbing.

Excellent: 5% or lower

Good: 5% or lower and not more than 10%

Allowable: 10% or more and not more than 20%

No Good: 20% or more (4) Offset Resistance

The offset resistance was evaluated in such a manner that a sample image, in which the image area was about 5%, was printed out and the degree of contamination of the image after 3000 sheets had been printed.

Excellent: (no contamination)

Good: (substantially no contamination)

Allowable: (allowable contamination)

No Good: (too contaminated)

On the other hand, the state in which the residual toner was adhered to the development sleeve and the influence on the printed image were visually evaluated after the printing test had been completed.

Excellent: no generation

Good: substantially no generation

Allowable: adhesion was observed but influence is not critical

No Good: excessive adhesion took place and image irregularity took place

Similarly, damage of the surface of the photosensitive drum and the state of the adhesion of the residual toner and the influence on the printed image were visually evaluated.

Excellent: no generation

Good: slight damage was found but influence on the image was not critical

Allowable: adhesion and damage took place, but influence on the image was not critical No Good: adhesion was excessive and vertical line shape image defect took place Simultaneously, the surface of the fixing film was observed and the durability was evaluated.

(1) State of the Film

Damage and wear of the surface of the fixing film after the printing test had been performed were visually evaluated.

Excellent: No generation

Good: Substantially no generation

Allowable: Allowable level

No Good: Critical level (2) State of Adhesion of Residual Developer

The state of adhesion of the residual developer on the fixing film after the printing test had been completed was visually evaluated.

Excellent: No generation

Good: Substantially no generation

Allowable: Allowable adhesion took place

No Good: Critical adhesion took place

TABLE 3

| | | | Printed out Image | | | |
|---|---|---|---|---|---|---|
| | Toner No. | Resin composition | Image density | Image quality | Fixation | Offset Resistance |
| E1 | (A) | (I) | Excellent | Excellent | Excellent | Excellent |
| E2 | (B) | (II) | Good | Good | Good | Excellent |
| E3 | (C) | (III) | Good | Good | Excellent | Excellent |
| E4 | (D) | (V) | Excellent | Excellent | Excellent | Excellent |

TABLE 3-continued

| | | | | | | |
|---|---|---|---|---|---|---|
| E5 | (E) | (VI) | Good | Good | Good | Good |
| E6 | (F) | (V) | Good | Good | Good | Excellent |
| E7 | (G) | (VI) | Good | Allowable | Excellent | Allowable |
| E8 | (H) | (IV) | Good | Good | Excellent | Excellent |
| E9 | (I) | (IV) | Good | Good | Good | Excellent |
| E10 | (J) | (IV) | Good | Allowable | Good | Excellent |
| C1 | (a) | (i) | Allowable | No Good | Allowable | No Good |
| C2 | (b) | (ii) | No Good | No Good | Allowable | No Good |

| | | | | | Durability of Fixing Film | |
|---|---|---|---|---|---|---|
| | Toner No. | Resin composition | Development Sleeve Surface State | Photosensitive Drum Surface State | Surface State | Fixation of Residual Toner |
| E1 | (A) | (I) | Excellent | Excellent | Excellent | Excellent |
| E2 | (B) | (II) | Excellent | Excellent | Good | Good |
| E3 | (C) | (III) | Good | Excellent | Good | Good |
| E4 | (D) | (V) | Good | Good | Good | Good |
| E5 | (E) | (VI) | Excellent | Good | Good | Allowable |
| E6 | (F) | (V) | Good | Good | Allowable | Allowable |
| E7 | (G) | (VI) | Good | Good | Allowable | Good |
| E8 | (H) | (IV) | Excellent | Excellent | Excellent | Excellent |
| E9 | (I) | (IV) | Good | Good | Good | Good |
| E10 | (J) | (IV) | Good | Good | Allowable | Allowable |
| C1 | (a) | (i) | Good | Good | Excellent | Allowable |
| C2 | (b) | (ii) | Good | No Good | Good | No Good |

Symol E represents Example and C represents Comparative Example.

As described above, the present invention is arranged in such a manner that the binder for the toner is manufactured by polymerizing the polymer forming the high-molecular weight region by using both the polyfunctional initiator and the monofunctional initiator under the presence of crosslinking monomer unit. Therefore, large molecular weight can be realized. By previously dissolving the high-molecular-weight polymer under presence of the polyolefin solution and by mixing it with the low-molecular-weight polymer, the dispersion characteristics of the high-molecular-weight polymer can be improved and the fusion to the surface of the developer carrier and the photosensitive member can be prevented while maintaining excellent fixation and offset resistance. Therefore, the durability can be improved and images of high quality can be formed.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A process for producing a resin composition, comprising the steps of:

(a) reacting a mixture of a polymerizable monomer and a cross-linking monomer in the presence of a polyfunctional polymerization initiator and a monofunctional polymerization initiator to produce a high molecular weight polymer having a weight average molecular weight of 1,200,000 or more;

(b) dissolving or dispersing said high molecular weight polymer, a low molecular weight polymer having a weight average molecular weight of 30,000 or less and a low molecular weight wax having a weight average molecular weight of 30,000 or less in an organic solvent; and (c) removing said organic solvent from the resultant mixture to obtain a resin composition (i) which does not substantially contain insoluble tetrahydrofuran (THF) component, (ii) which provides a GPC chromatograph measured of a soluble tetrahydrofuran (THF) component with a main peak in a region of a weight average molecular weight of 2,000 to 30,000 and a subpeak or a shoulder in a high molecular weight region of a weight average molecular weight of 100,000 or more, and (iii) which has a ratio of weight average molecular weight (Mw)/number average molecular weight (Mn) of 30 or more.

2. The process according to claim 1, wherein said high molecular weight polymer is polymerized by adding said monofunctional initiator after said polyfunctional initiator has been added.

3. The process according to claim 1, wherein said high molecular weight polymer and a low molecular weight wax are previously dissolved or dispersed in an organic solvent so that a first mixture is prepared, said first mixture and an organic solvent solution of said low molecular weight polymer are mixed with each other so that a second mixture is prepared, and said organic solvent is removed from said second mixture so that said resin composition is prepared.

* * * * *

UNITED STATES PATENT AND TRADEMARK OFFICE

CERTIFICATE OF CORRECTION

PATENT NO. : 5,854,365

DATED : December 29, 1998

INVENTOR(S) : MANABU OHNO ET AL.

It is certified that error appears in the above-identified patent and that said Letters Patent is hereby corrected as shown below:

On the title page:

[56] REFERENCES CITED

Foreign Patent Documents
"59-87051" should read --56-87051--.

[63] RELATED U.S. APPLICATION DATA

"Continuation of Ser. No. 182,387," should read
"Division of Ser. No. 182,357,--.

COLUMN 1

Line 5, "continuation" should read --division--.
Line 12, "an" (first occurrence) should be deleted.

COLUMN 3

Line 61, "rising of a desire" should read
--a rising desire--.

UNITED STATES PATENT AND TRADEMARK OFFICE
CERTIFICATE OF CORRECTION

PATENT NO. : 5,854,365

DATED : December 29, 1998

INVENTOR(S) : MANABU OHNO ET AL.

It is certified that error appears in the above-identified patent and that said Letters Patent is hereby corrected as shown below:

COLUMN 4

Line 1, "that toner is obtained" should read --a toner--.
Line 8, "present" should read --present invention--.

COLUMN 5

Line 52, "is" should read --are--.

COLUMN 8

Line 50, "acryate" should read --acrylate--.

COLUMN 11

Line 18, "vin,l" should read --vinyl--.
Line 60, "solvesso" (both occurrences) should read --Solvesso-.

UNITED STATES PATENT AND TRADEMARK OFFICE

CERTIFICATE OF CORRECTION

PATENT NO. : 5,854,365

DATED : December 29, 1998

INVENTOR(S) : MANABU OHNO ET AL.

It is certified that error appears in the above-identified patent and that said Letters Patent is hereby corrected as shown below:

COLUMN 12

Line 8, "polymer is heated;" should read --polymer;--.

COLUMN 17

Line 10, "atoms," should read --atom,--; and "atoms," should read --atom,--.

COLUMN 18

Line 14, "alkeyl" should read --alkyl--.

COLUMN 21

Line 66, "on" should read --one--.

COLUMN 30

Line 51, "is" should read --in--.

UNITED STATES PATENT AND TRADEMARK OFFICE

CERTIFICATE OF CORRECTION

PATENT NO. : 5,854,365

DATED : December 29, 1998

INVENTOR(S) : MANABU OHNO ET AL.

It is certified that error appears in the above-identified patent and that said Letters Patent is hereby corrected as shown below:

COLUMN 31

Line 15, "=600V" should read ---600V--.
Line 37, "contact in" should read --in contact with--;
line 41, "/minutes" should read --/minute--.

Signed and Sealed this

Fourteenth Day of December, 1999

Attest:

Q. TODD DICKINSON

*Attesting Officer*

*Acting Commissioner of Patents and Trademarks*